United States Patent
Wan et al.

(10) Patent No.: US 11,658,754 B2
(45) Date of Patent: May 23, 2023

(54) ON-DEMAND AERIAL COMMUNICATION USING DIRECTIONAL ANTENNAS

(71) Applicants: Board of Regents, The University of Texas System, Austin, TX (US); University of North Texas, Denton, TX (US)

(72) Inventors: Yan Wan, Plano, TX (US); Yixin Gu, Austin, TX (US); Chenyuan He, Austin, TX (US); Songwei Li, Austin, TX (US); Mushuang Liu, Austin, TX (US); Shengli Fu, Austin, TX (US)

(73) Assignees: Board of Regents, The University of Texas System, Austin, TX (US); University of North Texas, Denton, TX (US)

( * ) Notice: Subject to any disclaimer, the term of this patent is extended or adjusted under 35 U.S.C. 154(b) by 0 days.

(21) Appl. No.: 17/168,973

(22) Filed: Feb. 5, 2021

(65) Prior Publication Data

US 2021/0258089 A1    Aug. 19, 2021

Related U.S. Application Data

(60) Provisional application No. 62/970,313, filed on Feb. 5, 2020.

(51) Int. Cl.
*H04B 17/318* (2015.01)
*H04B 7/0426* (2017.01)
*H04W 4/46* (2018.01)
*H04B 17/391* (2015.01)

(52) U.S. Cl.
CPC ........... *H04B 17/318* (2015.01); *H04B 7/043* (2013.01); *H04B 17/391* (2015.01); *H04W 4/46* (2018.02)

(58) Field of Classification Search
CPC .... H04B 17/318; H04B 7/043; H04B 17/391; H04B 7/0617; H04B 7/086; H04B 7/0897; H04B 7/026; H04B 17/104; H04W 4/46; H04W 4/40
See application file for complete search history.

(56) References Cited

U.S. PATENT DOCUMENTS

| | | | |
|---|---|---|---|
| 2017/0155456 A1* | 6/2017 | Wennerlöf | G01R 29/10 |
| 2021/0025975 A1* | 1/2021 | Seeber | G01S 13/86 |
| 2022/0069449 A1* | 3/2022 | Xue | H01Q 21/205 |

* cited by examiner

*Primary Examiner* — Fred A Casca
(74) *Attorney, Agent, or Firm* — Thomas | Horstemeyer, LLP

(57) ABSTRACT

The present disclosure presents aerial communication systems and methods. One such system comprises an unmanned aerial vehicle platform and a communication component integrated with the unmanned aerial vehicle platform, wherein the communication component is configured to establish an Air to Air (A2A) communication channel with a remote directional antenna that is integrated with a remote unmanned aerial vehicle platform. The system further includes a computing component integrated with the unmanned aerial vehicle platform, wherein the computing component is configured to determine an optimal heading angle for transmission of communication signals from a directional antenna to the remote directional antenna in an unknown communication environment from received signal strength indicator (RSSI) information obtained from the remote directional antenna. Other systems and methods are also disclosed.

18 Claims, 16 Drawing Sheets

ON-DEMAND AERIAL COMMUNICATION USING DIRECTIONAL ANTENNAS

CROSS-REFERENCE TO RELATED APPLICATION

This application claims priority to U.S. provisional application entitled, "ON-DEMAND AERIAL COMMUNICATION USING DIRECTIONAL ANTENNAS," having Ser. No. 62/970,313, filed Feb. 5, 2020, which is entirely incorporated herein by reference.

STATEMENT REGARDING FEDERALLY SPONSORED RESEARCH OR DEVELOPMENT

This invention was made with government support under Grant Nos. 1522458, 1730570, 1730675, and 1714519 awarded by National Science Foundation. The government has certain rights in the invention.

BACKGROUND

Unmanned Aerial Vehicle (UAV) networking extends the capability of a single UAV to multiple UAVs and is foreseen to have broad uses in a wide spectrum of commercial UAV applications, such as on-demand emergency, surveillance, reconnaissance, and remote sensing. Several communication schemes for low-altitude UAV platforms have been developed, such as omnidirectional networking and cellular-based communication.

For applications such as emergency response, it is crucial to develop broadband and long-distance on-demand communication capabilities, such that monitoring videos at remote locations can be transmitted over a long distance to emergency management centers in real time. Accordingly, a communication architecture should not rely on ground infrastructure support so that it can be applied whenever needed in scenarios where infrastructures (e.g., cellular networks) are not available. Compared to the omni-directional communication solutions, the use of directional antennas allows the energy to focus along a certain direction, and thus offers various benefits such as extended communication distance, reduced antenna power consumption, and reduced communication interference. To date, studies on directional antennas and narrow-beam communication schemes have focused on air ground communication, but not on UAV-to-UAV communication.

Robust UAV-to-UAV communication is critical to support an increasing number of commercial multi-UAV applications. A promising solution is aerial communication using directional antennas (ACDA) with features involving long communication distance with low power consumption, broad bandwidth, and interference rejection. Nevertheless, ACDA requires the automatic alignment of directional antennas, which is not easy to achieve considering the imperfect communication environment unknown in advance and the limited sensing devices onboard due to the constrained payloads and power sources.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems, apparatuses, and methods for improved aerial communications using directional antennas (ACDA). In accordance with the present disclosure, an improved ACDA system is implemented, including the platform, communication, computing, control, middleware, and interface components. Practical implementation issues for the emergency response application are also considered in the present disclosure. An exemplary improved ACDA system features a communication and control co-design, where a communication quality indicator, such as a received signal strength indicator (RSSI), serves as the goal function for antenna alignment. The solution also features a reinforcement learning (RL)-based directional antenna control algorithm that learns the unknown communication environment models. The performance of the improved ACDA system is verified using simulation studies, field tests, and disaster drills.

Figure 1:
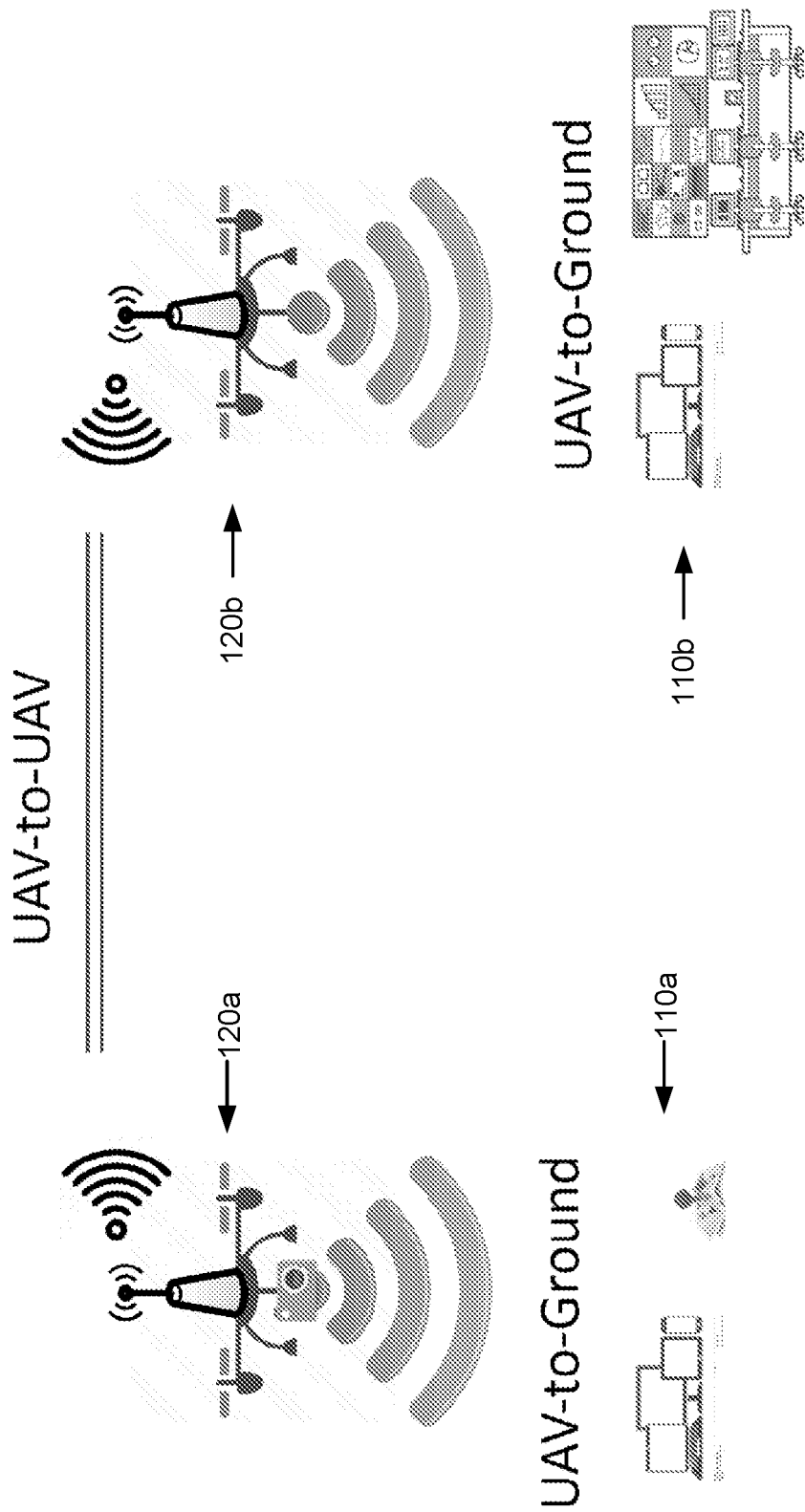
FIG. 1 shows an illustration of a broadband long-distance communication infrastructure using controllable UAV-carried directional antennas in accordance with the present disclosure.

In the past few years, several solutions using UAV-carried directional antennas have been developed to realize the on-demand broadband and long-distance UAV-to-UAV communication, as illustrated in FIG. 1 and referred to as an aerial communication using directional antennas (ACDA) system. When the ground devices 110a, 110b are of non-line of sight (NLOS), the UAVs 120a, 120b dispatched to the air serve as relays to establish communication between the ground devices 110a, 110b and solve the NLOS challenge.

A paper by Gu, et al. (Gu, Y., Zhou, M., Fu, S., Wan, Y, "Airborne WiFi Networks through Directional Antennae: An Experimental Study," Proceedings of Wireless Communications and Networking Conference (WCNC) (2015), pp. 1314-1319) verified the feasibility of long-distance and broadband UAV communication through directional antennas using experimental studies and developed a version of the ACDA system where the UAV locations are fixed. In order to enable a robust communication channel subject to UAV mobility, the autonomous alignment of antenna directions is needed.

Thus, an autonomous alignment solution was developed that included two UAV-to-UAV channels, in which the directional antenna-equipped channel transmitted application-oriented data, such as video streams, and the other low-rate omni-directional antenna-equipped channel transmitted control and command signals, such as GPS locations of the remote UAV and synchronization signals. In a paper by Xie, et al. (Xie, J., Al-Emrani, F., Gu, Y., Wan, Y., Fu, S., "UAV-Carried Long-Distance Wi-Fi Communication Infrastructure," Proceedings of AIAA Infotech @ Aerospace (2016), pp. 0747-0760), a proportional-integral-derivative (PID) controller was designed to align antenna headings under wind disturbances based on GPS signals transmitted through the omni-directional channel. In a paper by Chen, et al. (Chen, J., Xie, J., Gu, Y., Li, S., Fu, S., Wan, Y., et al., "Long-Range and Broadband Aerial Communication Using Directional Antennas (ACDA): Design and Implementation," IEEE Transactions on Vehicular Technology (2017), Vol. 66, pp. 10793-10805, hereinafter referred to as the Chen paper), a complete ACDA system was designed and implemented with detailed descriptions of the UAV platform configuration, onboard autopilot, communication system, and antenna heading control. For the antenna heading control, a Linear Quadratic Gaussian (LQG) controller was developed to minimize a quadratic GPS-based tracking error. An initial scan algorithm that achieves automatic antenna direction alignment without the presence of GPS signals was also developed. The performance of this earlier version of the ACDA system was verified using both simulation studies and field tests.

In order to improve the UAV-to-UAV communication quality, communication quality indicators can be utilized to assist with the antenna controller design. Widely used wireless communication quality indicators include the channel throughput, bit error rate (BER), signal-to-noise ratio (SNR), and received signal strength indicator (RSSI). All of these indicators are related to the transmitting and receiving signal powers. A special interest in the present disclosure is the RSSI, which measures the received signal power that is transmitted from the transmitting antenna and can be directly obtained from the received signal at the receiving antenna without additional measurement equipment. With the same transmitting signal power, a stronger RSSI leads to a higher SNR and, in turn, a lower BER and a larger channel capacity. As such, the RSSI is adopted as the communication performance indicator to quantify the performance of a UAV-to-UAV wireless communication channel in ACDA in various embodiments of the present disclosure.

In a paper by Yan, et al. (Yan, J., Wan, Y., Fu, S., J., X., Li, S., Lu, K., "RSSI-Based Decentralized Control for Robust Long-Distance Aerial Networks using Directional Antennas," IET Control Theory and Applications (2016), Vol. 11, Issue 11, pp. 1838-1847), the RSSI was used as an additional measurement signal to compensate GPS signals for the automatic alignment of directional antennas, and a proportional-integral (PI) controller was used for antenna control. The PI controller was designed based on two assumptions: (1) the RSSI model is known ahead of time, and (2) the strongest RSSI is achieved when two directional antennas point towards each other. These assumptions may not hold in an imperfect communication environment, considering the existence of reflection, refraction, and absorption by buildings, obstacles, and interference sources, which complicate the communication channel model. The present disclosure describes an autonomous antenna heading alignment solution that optimizes the antennas' headings to achieve maximal RSSI in real imperfect environments with the communication channel model unknown in advance. In particular, a Reinforcement Learning (RL)-based online optimal controller learns the environment-specific communication channel model in real time.

In accordance with embodiments of the present disclosure, a unified communication channel is provided for application, control, and command data. For example, application, control, and command data can share the same directional antenna-equipped UAV-to-UAV channel. This networking design is very different from previous versions which separate the high-rate directional antenna-equipped application channel and the low-rate omni-directional antenna-equipped control and command channel. Embodiments of the present disclosure improves the robustness of the ACDA system, as the omni-directional antenna-equipped control and command channel is sensitive to interferences in long-distance set-ups.

Embodiments of the present disclosure further provide an RL-based directional antenna control that maximizes communication performance in unknown communication environments. For example, an exemplary solution features a communication and control co-design, where a communication quality indicator, (e.g., a received signal strength indicator) serves as the antenna control's goal function. A reinforcement learning (RL)-based online optimal controller is configured to find the optimal heading angles that maximize the RSSI of directional antennas in an imperfect environment. An exemplary solution can also be coupled with an algorithm that learns an environment-specific communication channel model in an unknown communication environment. Such an antenna control solution maximizes the communication performance in real settings, as it does not require a known and perfect communication channel model as was assumed in previous versions of ACDA. Another improvement is related to the integrated design of a high-performance exemplary ACDA system and implementation of the communication, control, and computing components of the ACDA system. Such implementation adopts the Robot Operating System (ROS) to facilitate communication and data transmissions. The computing functionality can be implemented using a processor, such as, but not limited to, a BeagleBone Black (BBB), a compact low-power single-board computer suitable for UAV applications. BeagleBone Black features a powerful CPU, multiprocessing capability, and ROS support. Other processors, such as a NVIDIA Jetson TX2 Module (TX2), can also be used to improve the computing capability, in various embodiments.

In various embodiments, the improved ACDA system can be applied in emergency scenarios by providing an on-demand broadband communication channel to transmit both optical and infrared monitoring videos of the disaster zone over a long distance to an emergency management center. Special considerations of emergency practices are considered in the design and implementation of the improved ACDA system. In particular, an interface using ROS and Qt, a cross-platform application framework, are featured in various embodiments. The interface can display, at ground stations, the status information of the entire system, such as GPS, antenna headings, and RSSI for system diagnosis. The interface can also display video streams captured by the remote UAV. In addition, a water-resistant enclosure is designed to protect the improved ACDA system from adverse environmental conditions for practical use, in various embodiments.

Figure 2:
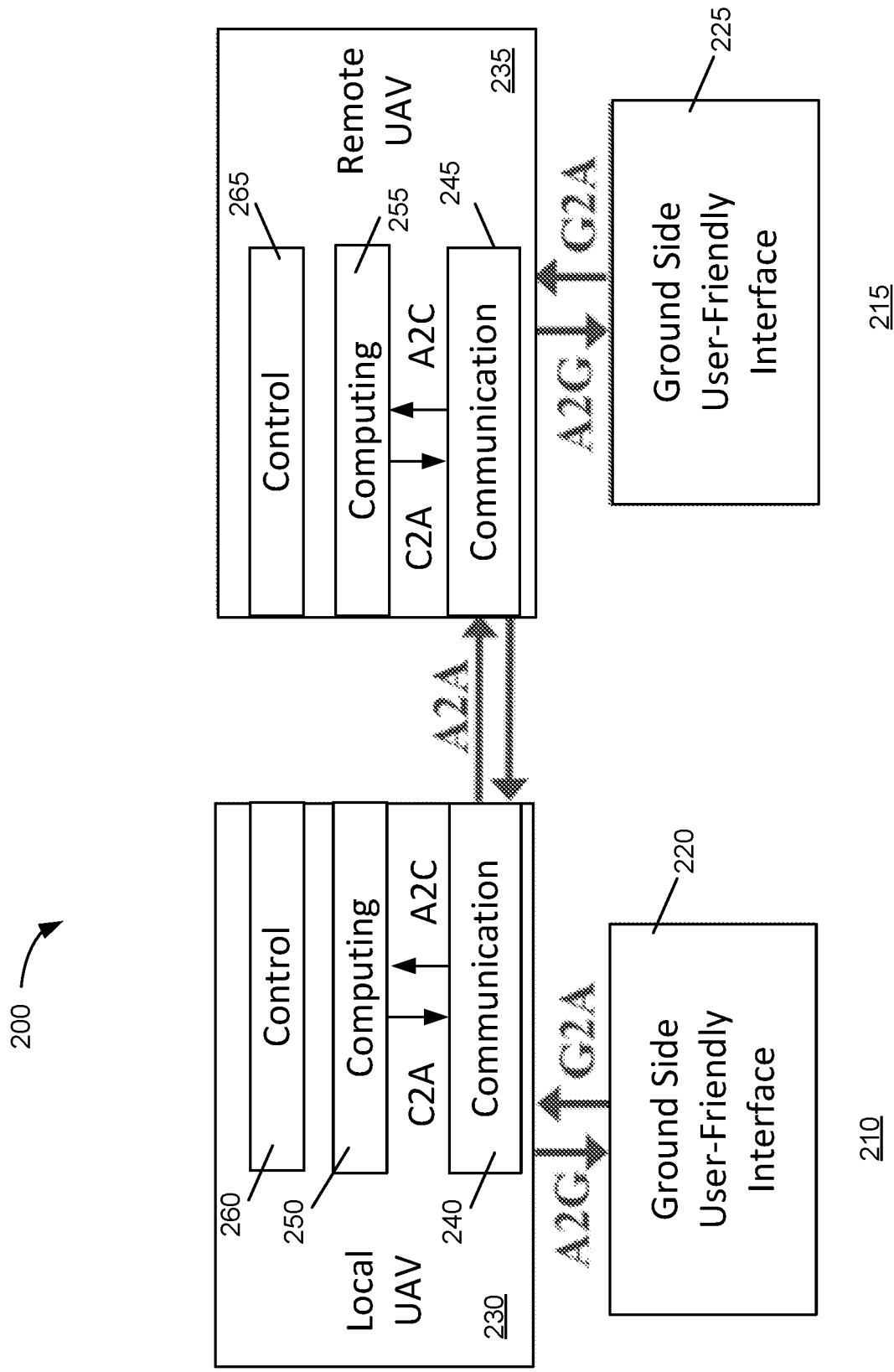
FIG. 2 shows an overview of an exemplary improved ACDA system in accordance with embodiments of the present disclosure.

Next, a description of an exemplary improved ACDA system design, including both hardware and software structures, is presented. An objective of the improved ACDA system is to provide a robust and cost-effective long-distance and broadband UAV-to-UAV communication channel for on-demand emergency communication, and meanwhile, to offer a user-friendly interface that simplifies the operation and diagnosis procedures. In various embodiments, the improved ACDA system 200 is composed of a pair of integrated subsystems on both the local side 210 and the remote side 215. In one embodiment, the subsystem on each side includes a computing device (providing a user-friendly graphical interface) 220, 225, a UAV platform 230, 235, and onboard communication 240, 245, computing (that includes antenna controller logic) 250, 255, and control components 260, 265, as illustrated in FIG. 2.

The role of the communication component 240, 245 is to connect modules of the improved ACDA system 200 through wired and wireless links. In various embodiments, three types of wireless communication links in the improved ACDA system 200 include the Air to Ground (A2G)/Ground to Air (G2A), Air to Air (A2A), and Air to Computing module (A2C)/Computing module to Air (C2A) links. Multiple communication technologies are adopted to avoid mutual interference. The role of the computing component ("antenna controller") 250, 255 is to collect data from sensors and the other components, process the computing and learning tasks, and then output the motor control signal to the control component 260, 265. The role of the control component 260, 265 is to drive the motor that rotates the directional antennas for autonomous alignment and form a robust long-distance communication channel.

Figure 3:
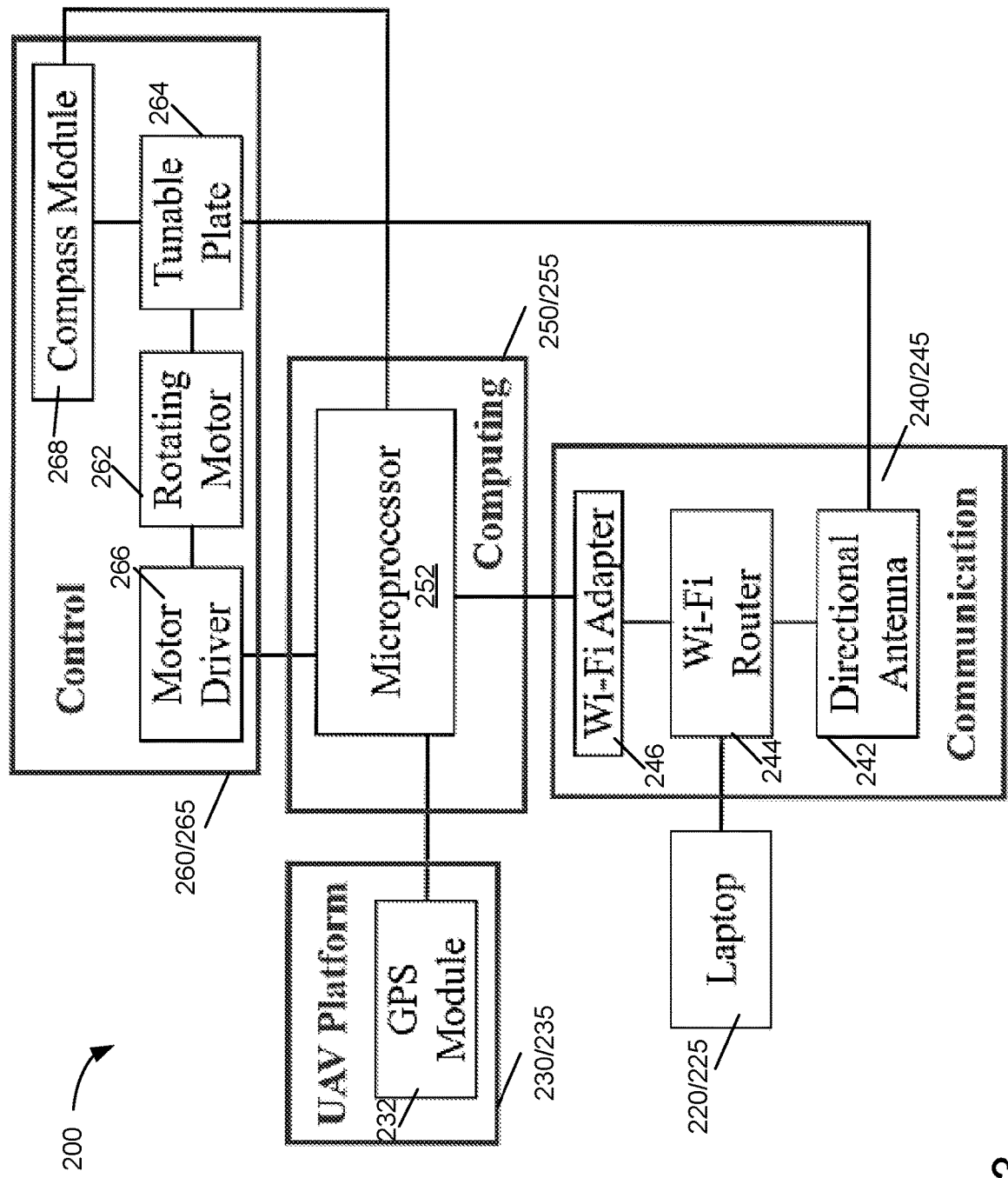
FIG. 3 shows components at one side of the improved ACDA system of FIG. 2.

FIG. 3 shows the modules of each component and their connections of the subsystem on one side. The communication component 240, 245 includes a directional antenna 242, a Wi-Fi router 244, and a Wi-Fi adapter 246. The computing component 250, 255 is realized on a microprocessor 252. The control component 260, 265 contains a rotating motor 262, a tunable plate 264, a motor driver 266, and a compass module 268. The user interface installed on the computing device 220, 225 is connected to the communication component 240, 245 through the Wi-Fi router 244. A GPS module 232 on the UAV platform 230, 235 is connected to the microprocessor 252.

Figure 4:
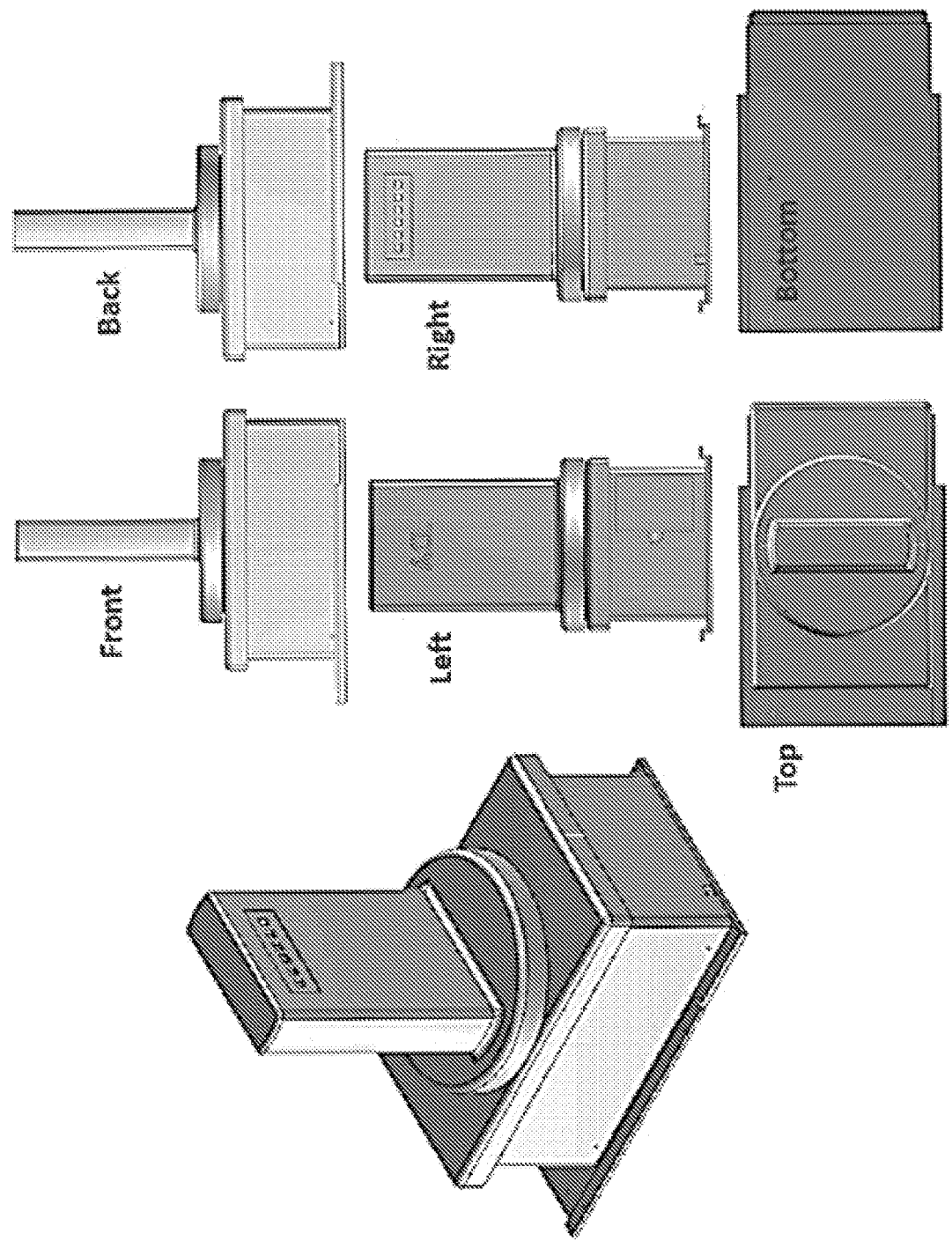
FIG. 4 shows an exemplary water-resistant enclosure design for the improved ACDA system in accordance with embodiments of the present disclosure.

To facilitate practical use of the improved ACDA system in emergency scenarios, a water-resistant enclosure is provided to protect the core components, as shown in FIG. 4. The UAV platform carries the improved ACDA system and also performs various flight missions. Considering the performance metrics, such as payload, flight time, expandability, stability, and operability, a DJI Matrice 100, a quadcopter, is selected as the UAV platform in one embodiment. An alternative candidate, among others, of the UAV platform is Tarot 650, which also has good performance and less interference between the UAV platform and the communication system. The features of the DJI Matrice 100 that match application preferences are summarized as follows.

Matrice 100 is made of durable and lightweight carbon fiber. The maximum takeoff weight of DJI Matrice 100 is 3.6 kg, larger than the total weight of the system (3.13 kg), including the platform, the ACDA prototype, and a TB48D battery. The TB48D, a LiPo 6S battery, can support a flight time of about 18 minutes based on flight tests. Other embodiments may utilize a different battery, such as those having a greater charge capacity and/or a lower weight.

The expansion bay on the top of Matrice 100 nicely installs the onboard components. In addition, Matrice 100 provides universal power and communication ports, including dual parallel CAN ports and dual UART ports. Matrice 100 is also programmable using the DJI Software Development Kit (SDK), which supports Linux, ROS, Qt and STM32 development environments.

Matrice 100 uses, but is not limited to using, the N1 autopilot, which maintains a stable flight including hovering, under up to 10 m/s wind disturbances. Each of the arms incorporates a dampening component that eliminates the vibrations generated from the motors, to improve the stability of the system. In addition, the landing pads are installed at the base of each arm to protect Matrice 100 during landing.

Like other commercial UAVs, the DJI Matrice 100 is ready to fly out of the box. The remote controller adopts a simple design. All parameters can be monitored and tuned via a mobile app called "DJI GO." This app supports a live monitoring of control parameters and real-time videos from any connected smart phones. Some critical information including battery time and GPS signal strength are displayed.

To support the ACDA system, the GPS module 232 (Adafruit ultimate GPS breakout version 3) is installed on the DJI Matrice 100 frame. It is a high-quality GPS module that can track up to 22 satellites on 66 channels with a high-sensitivity, high-speed receiver and a built-in antenna. In addition, it has the data-logging capability that can record up to 16 hours of data using a FLASH memory.

Figure 5:
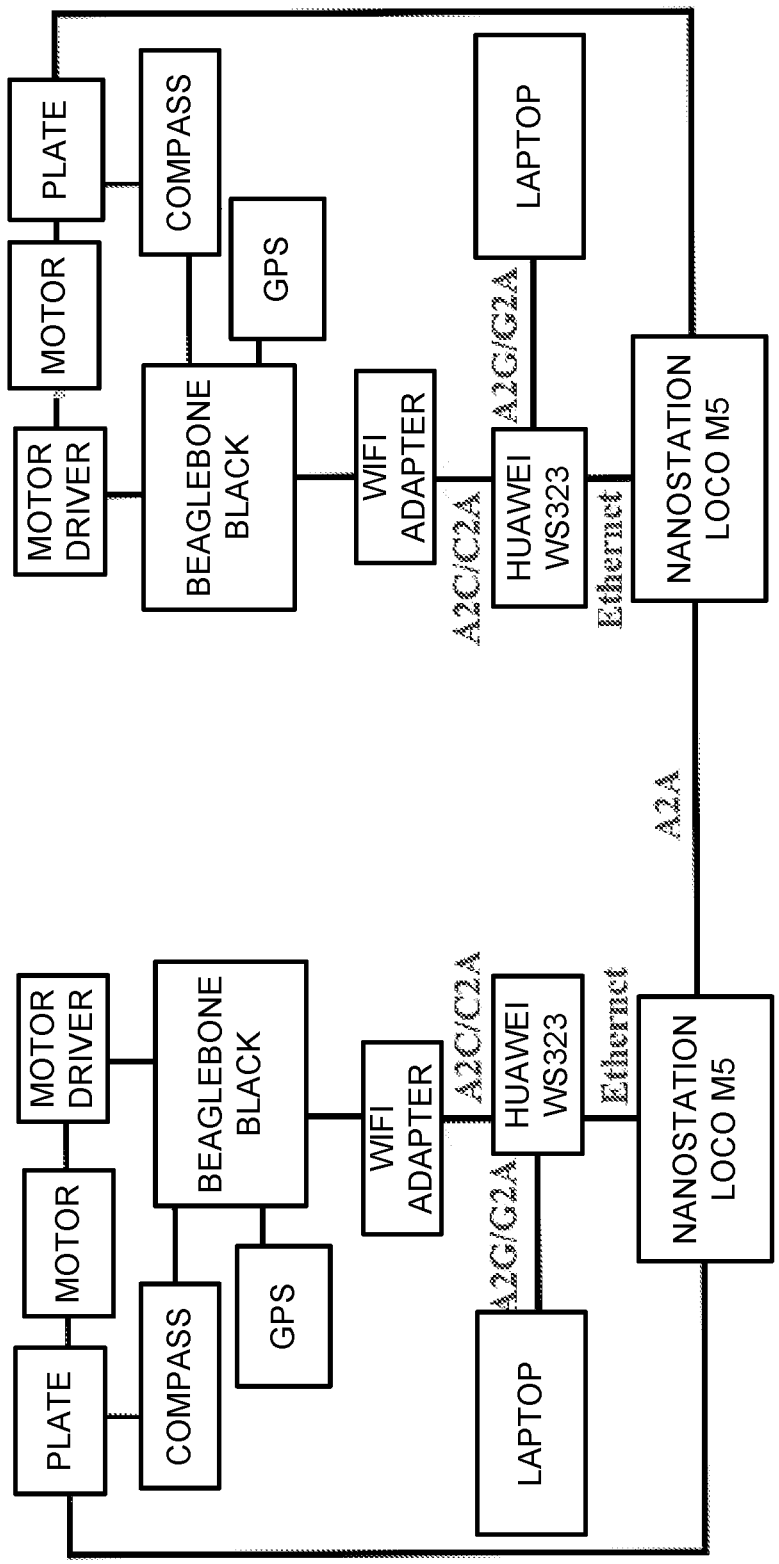
FIG. 5 illustrates various connections among different components of the improved ACDA system of FIG. 3.

The communication component 240, 245 is for the improved ACDA system 200, which includes both intra- and inter-device links. The communication links in the improved ACDA system include the wired links between the directional antenna 242 and the Wi-Fi router 244, and the wireless links for the A2A, A2G, G2A, A2C, and C2A communications, as illustrated in FIG. 5.

Regarding the A2A link, in one embodiment, a Ubiquiti Nanostation Loco M5 is selected as the directional antenna unit 242 to establish the A2A communication link, based on an evaluation of the performance, scalability, cost, size and weight. Utilizing the 2×2 multiple-input and multiple-output (MIMO) technology, Loco M5 is a small form factor unit operating at the 5 GHz band with default antenna gain of 13 dBi. In addition, it adopts an improved time division multiple access (TDMA) technology, enabling the unit 242 to connect multiple clients with low latency. In various embodiments, the data rate is up to 150 Mbps and the maximum transmission distance is up to 10 km. Multiple modes can be selected according to application scenarios, including access point (AP) mode, client mode, and wireless distribution system (WDS) mode. In an exemplary design, both the application data and the command and control signals are transmitted between the local and remote subsystems through the A2A link.

For the wired link, the Wi-Fi router 244 (Huawei WS323) is connected to Loco M5 through an Ethernet cable. Huawei WS323 supports both 2.4 GHz and 5 GHz bands and complies with the IEEE 802.11n standard. It adopts a 2×2 MIMO and delivers a wireless transmission rate of up to 300 Mbps while simultaneously providing the multi-device access capabilities.

Regarding A2G/G2A links, data from both the local and remote UAVs are transmitted to the ground in real time using the A2G link. A laptop 220, 225, or other computing device, on the ground on each side can be used to receive the application data and diagnosis information of the system, which are displayed on a user-friendly interface. The laptop 220, 225 is connected to Huawei WS323 through the wireless local area network (WLAN). The G2A link is a reverse process of A2G. By employing the interface, user control and command signals can be sent to the Huawei WS323 located on the corresponding UAV 230, 235, and then Huawei WS323 relays the information to their destinations in the network.

Regarding A2C/C2A links, data are transmitted to the microprocessor 252 for processing through the A2C link. BeagleBone Black, the microprocessor 252, is responsible for all the computing and learning tasks based on data received through a Wi-Fi adapter 246 from other components in the network. The C2A Link is a reverse process of the A2C link. The microprocessor 252 sends processing results to its destinations in the network through the Wi-Fi adapter 246.

Other than the aforementioned wireless links designed for the improved ACDA system, the operation of an exemplary improved ACDA system also utilizes several other wireless links. Altogether, in various embodiments, there are five types of wireless links required for the improved ACDA system: (1) GPS signal link (1575 MHz) which utilized the location information from GPS satellites, (2) flight control signal link (2.4 GHz) which transmits control commands of the remote controller to the corresponding UAV, (3) A2A link (5 GHz) which connects the local and remote subsystems of the improved ACDA system, (4) A2G/G2A link (2.4 GHz/5 GHz) connects the laptops 220, 225 to the ACDA network, and (5) A2C/C2A link (2.4 GHz) which connects the microprocessors 252 to the ACDA network.

Figure 6:
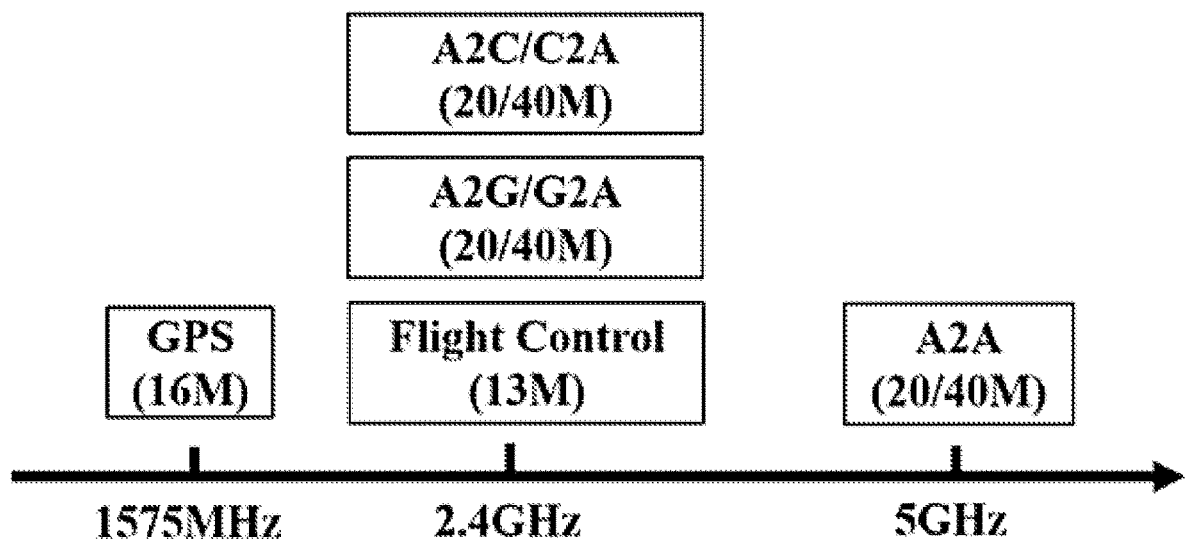
FIG. 6 shows the frequencies and bandwidths of the wireless links in an exemplary embodiment of the improved ACDA system in accordance with embodiments of the present disclosure.

The GPS signal operates on a frequency which does not cause the interference with other links. Since BeagleBone Black supports only 2.4 GHz, the A2C/C2A links can only operate on the 2.4 GHz frequency band, and hence, the Huawei WS323 can be configured to operate on 2.4 GHz. Because the A2C/C2A and the A2G/G2A are supported by the same Wi-Fi router, i.e., Huawei WS323, A2G/G2A link also operates on 2.4 GHz. The A2G/G2A, A2C/C2G, and the flight control signal link share the 2.4 GHz frequency band, which does not interfere with the A2A link. FIG. 6 shows the frequencies and bandwidths of the wireless links in an exemplary embodiment of the improved ACDA system.

To avoid the mutual interference among Huawei WS323, the flight control signal link, and the communication environment, an algorithm is implemented in various embodiments to automatically select the Wi-Fi channels for Huawei WS323 and the flight control system of DJI Matrices 100, as shown (below) in Algorithm 1.

Algorithm 1 Wi-Fi Channel Selection Algorithm
Requirement: An ACDA system placed in a given environment.
Output: Wi-Fi channels selected for both the local and remote Huawei WS323 and the flight control system of DJI Matrices 100.
Procedure:
1. Scan wireless signals and record their frequencies, channels, and RSSIs for the local subsystem.
2. Find the least crowded channel with low RSSIs and select it as the channel for local Huawei WS323.
3. Find another uncrowded channel with low RSSIs which does not overlap with local Huawei's channel, and select it as the channel for the local flight control of DJI Matrices 100.
4. Repeat the procedure 1 to 3 for remote subsystem.

The communication links in an exemplary improved ACDA system are configured as follows.

For the Ubiquiti Nanostation Loco M5, the network modes of both the local and remote Nanostation Loco M5 are set up as a bridge, which is a point-to-point link. The wireless mode of the local Nanostation Loco M5 is chosen as a client, and the remote Nanostation Loco M5 is chosen as an access point. The same WLAN service set identifier (SSID) is selected for both the local and the remote sides. The output power is set as 23 dBm. In various embodiments, the most secure option WPA2-PSK (AES) is selected, which applies the Wi-Fi protected access II (WPA2) algorithm with the advanced encryption standard. Accordingly, channel width is set to 40 MHz and the WLAN IP addresses for both sides are randomly selected in the same subnet. For example, in an exemplary system, the local Nanostation IP address is set as 192.168.33.100 and the remote IP address is set as 192.168.33.110.

For the Huawei WS323, the Huawei WS323 is configured to operate on the 2.4 GHz frequency band. The channel width is set to 40 MHz and the WLAN communication standard of 802.11n is selected. Different SSIDs for the local Huawei router and the remote Huawei router can be selected, which both differ from the SSID of Ubiquiti Nanostation Loco M5. The IP addresses of the local and remote routers should also be in the same subnet as the Nanostations. For example, the IP address of the local Huawei router is set as 192.168.33.111 and the remote Huawei router is set as 192.168.33.121, in one embodiment. Regarding the Wi-Fi adapter 246, the IP addresses of the local and remote Wi-Fi adapters are set under the same subnet as Nanostations and Huawei routers, i.e., 192.168.33.130 for the local Wi-Fi adapter and 192.168.33.131 for the remote Wi-Fi adapter. Regarding the laptop 220, 225, both the local and remote laptops are set under the same subnet as other communication modules in the improved ACDA system, i.e., 192.168.33.21 for the local laptop and 192.168.33.122 for the remote laptop.

For the computing component ("antenna controller") 250, 255, the computing functionality is implemented on a microprocessor 252. As discussed, a BeagleBone Black (BBB) is selected as the microprocessor 252 in various embodiments, in which the BBB is a low-cost, community-supported development platform featuring a 32-bit RISC microprocessor. The BBB processor has a powerful CPU (ARM Cortex- A8) with up to 1 GHz clock time, compared to the 16 MHz clock time for the Arduino used in the previous version of ACDA. The BBB processor has 512 MB DDR3 RAM, 4 GB 8-bit eMMC onboard flash storage, 3D graphics accelerator, NEON floating-point accelerator, and two programmable real-time unit (PRU) 32-bit micro-controllers. The BeagleBone Black supports various ports, for example, USB, Ethernet, HDMI, and 2×46 pin headers, making it flexible for an exemplary ACDA design. In addition, the BBB is compatible with the Linux distributions Debian and Ubuntu, which serve as the platform for ROS, an open-source and meta-operating system. It also supports multiprocessing, which is very useful to transmit multiple sensor data streams with devices in the network. BeagleBone Black does not have a wireless card assembled, and hence a portable Wi-Fi adapter 246 can be attached to enable its communication with other components of the improved ACDA system.

The data processing in BeagleBone Black uses three types of data from the other components, including the GPS on the UAV platform 230, 235, compass data in the control component 260, 265, and RSSI retrieved from Nanostation Loco M5 (directional antenna unit 242) through a Wi-Fi adapter 246. The output is the motor control signal to the control component 260, 265.

Regarding the control component 260, 265, the directional antenna 242 and the compass module 268 are placed on a tunable plate 264, which is controlled by a motor. The motor driver 266 receives motor control signals from the microprocessor 252 and outputs pulse width modulation (PWM) signals to rotate the directional antenna 242 for a specified heading angle.

In various embodiments, Adafruit TB6612 is selected as the motor driver 266, and the rotating motor is a microgearmotor with a maximum speed of 130 revolutions per minute (RPM) and a gear ratio of 210:1. The tunable plate 264 is a plastic robot gear, and the compass module 268 is a MTI-3-8A7G6T Xsens. The tunable plate has a full 3D magnetometer-enhanced attitude and heading reference system (AHRS) with an in-run compass calibration (ICC) setting, which can compensate for magnetic distortions. In addition, the tunable plate provides an active heading stabilization (AHS) setting, which can significantly reduce the heading drift under magnetic disturbances. The antenna heading control algorithm to align the directional antennas for a robust A2A channel is described in subsequent sections of the present disclosure.

Regarding cameras in an exemplary improved ACDA system, the emergency response application generally requires both optical and infrared monitoring videos of the remote disaster zone to be transmitted to the ground station in real-time. On the remote side, the UAV 230, 235 carries a NVIDIA Jetson TX2 module that processes data from the two infrared and optical video sensors OV5693 and FLIR Lepton 2. As Jetson TX2 has a large development board, a carrier board of TX2 with weight 53 g and size 88 mm×65 mm, suitable for UAV applications is utilized. OV5693 is a ¼-inch, 5-megapixel image sensor, which delivers full 1080p high-definition video streams at 30 frames per second (fps). FLIR Lepton 2, a complete long-wave infrared (LWIR) camera, is connected to Jetson TX2 to capture infrared radiation and output a uniform thermal image. Jetson TX2 supports Ubuntu, and hence can run ROS. Jetson TX2 is connected to the remote Wi-Fi router, i.e. Huawei WS323 through WLAN with an IP address 192.168.33.133. The local ground station receives the two video streams from the remote UAV in real time through the A2A link.

In various embodiments, the Robot Operating System (ROS) is adopted to support data transmissions in an exemplary improved ACDA system. ROS is a widely used middleware for developing robot applications. ROS is a collection of tools, libraries, and conventions that enable users to build various applications by providing services such as low-level device control, message-passing between processes, and package management. ROS works well on traditional operating systems, such as Ubuntu in an exemplary case, and can support multi-device communication, distributed computation, and rapid testing.

A ROS package is a collection of files that serves for a specific purpose, generally including source files, executable files, and supporting files (libraries, configuration files, dataset, etc.). ROS nodes are a set of basic independent executable units that perform various tasks. In order to share information, all nodes must communicate with each other. The primary mechanism that ROS nodes adopt for communication is to send and receive messages. A message is a simple data structure containing typed fields. Messages are organized into named topics. A node shares information by publishing messages on appropriate topics, and a node receives information by subscribing to the corresponding topics. The nodes do not need to know whom they are communicating with, but only publish or subscribe messages of the topics of interest. ROS allows multiple publishers and subscribers for a topic. To facilitate the communication among nodes, a ROS master provides naming and registration services to the ROS nodes. The ROS master tracks publishers and subscribers of topics and enables individual ROS nodes to locate each other.

The use of ROS nodes provides several benefits to the design and implementation of the improved ACDA system. First, the publish/subscribe mechanism simplifies the data transmission among multiple components in a network. Second, the system is fault tolerant as crashes are isolated to individual nodes. Third, code complexity is reduced by encapsulating small tasks into nodes and assembling them in a structured way. Fourth, implementation details are hidden as the nodes expose a minimal application programming interface (API) to the rest of the system and hence can be easily modified or replaced.

Figure 7:
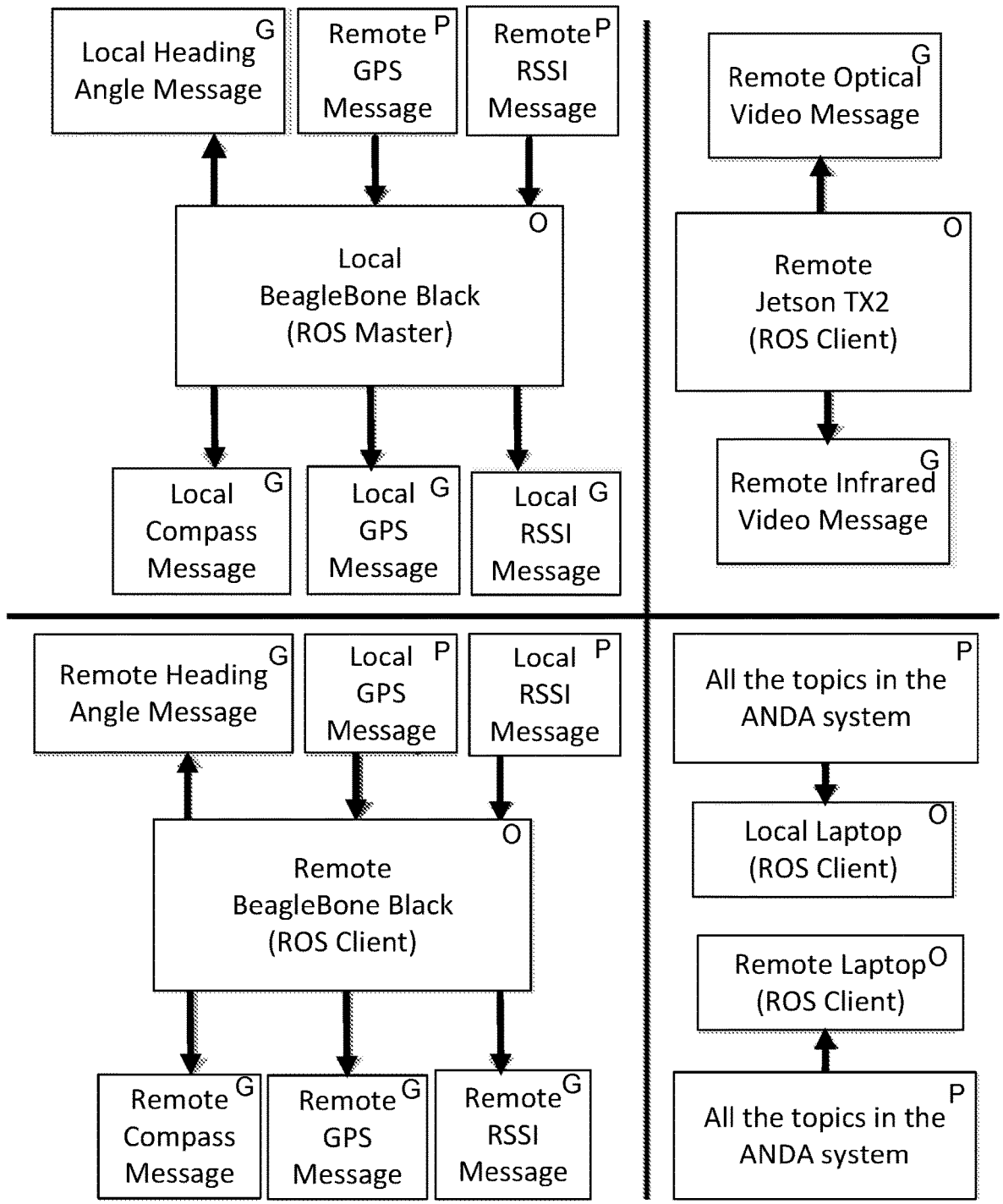
FIG. 7 shows a Robot Operating System (ROS) architecture and topics in an exemplary improved ACDA system in accordance with embodiments of the present disclosure.

An exemplary improved ACDA system has the following ROS architecture, in various embodiments. The ROS master runs on the local BeagleBone Black and has four ROS clients, including the remote BeagleBone Black, the Jetson TX2 carrier board to support video processing, the local laptop, and the remote laptop. The ROS topics published and subscribed by the ROS master and clients are shown in FIG. 7. In particular, FIG. 7 shows an ROS architecture and topics, in which the orange ("O") blocks denote the ROS hosts, including the ROS master and ROS clients; the green ("G") blocks denote published messages; and the purple ("P") blocks denote subscribed messages.

The messages in the system include GPS, RSSI, compass, and camera information. Each message here corresponds to a specific topic. The local BeagleBone Black publishes the local compass message, GPS message, RSSI message and heading angle message, and subscribes the remote GPS message and remote RSSI message to conduct the RL-based on-line directional antenna control algorithm at the local side. The remote BeagleBone Black functions in a similar way. The remote Jetson TX2 publishes two camera messages including the infrared video message and optical video message, so that the videos on the remote side can be tracked at the ground stations on the local side. The local laptop and the remote laptop subscribe all the topics in the ACDA system and display the information on a user-friendly interface to monitor the system performance and conduct various operations.

Figure 8:
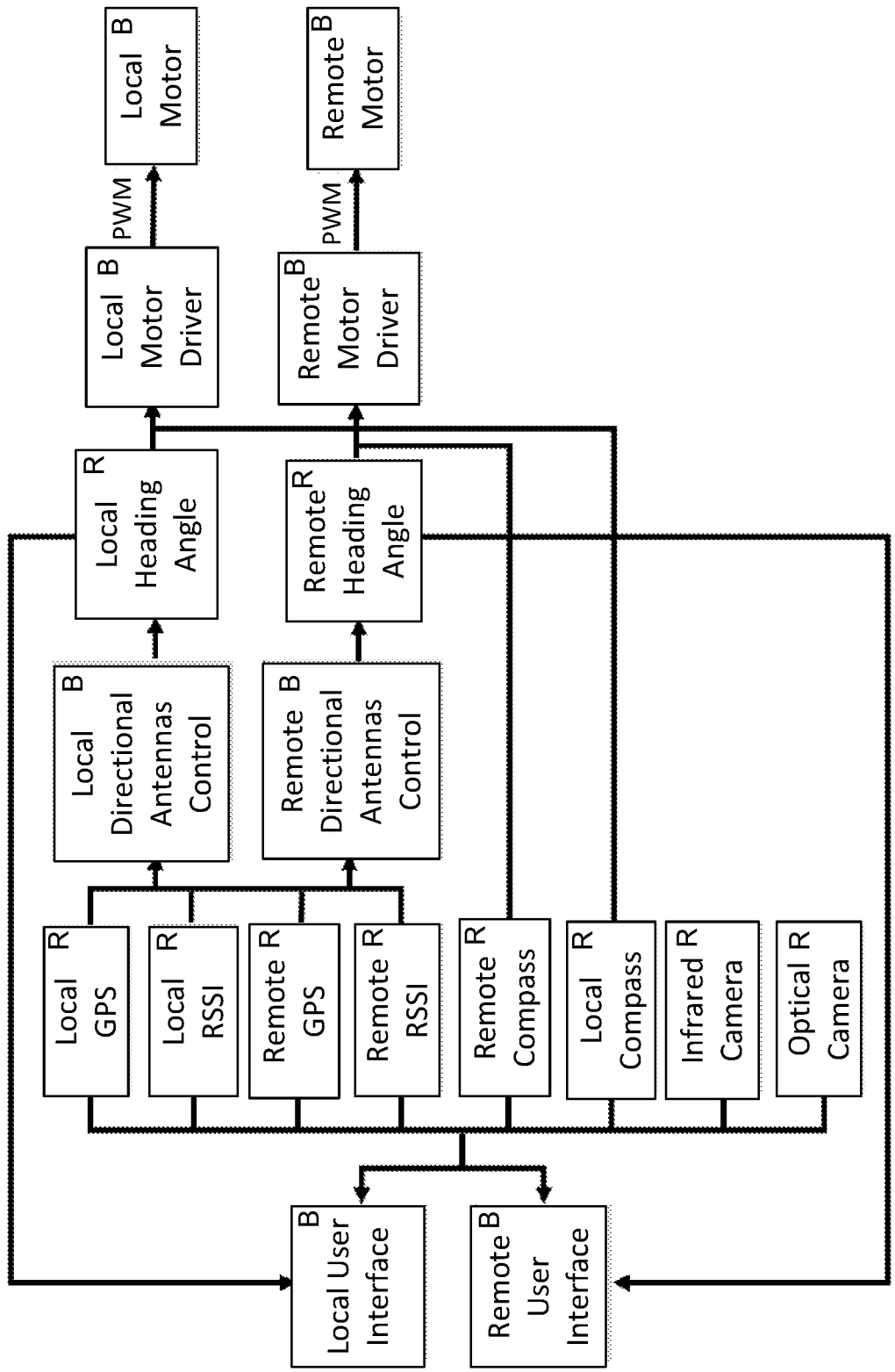
FIG. 8 shows an information flow of an exemplary improved ACDA system in accordance with embodiments of the present disclosure.

FIG. 8 shows an exemplary ROS information flow, in which red ("R") blocks denote messages in the system and blue ("B") blocks denote components to which these information flow. The local directional antenna control algorithm running on a microprocessor 252 calculates the local antenna heading angle by using both the local and remote GPS and RSSI signals and sends the PWM signals to the local motor driver 260, 265. The information flow on the remote side is similar. The local and remote user interfaces receive and display all the messages in the improved ACDA system 200.

Figure 9:
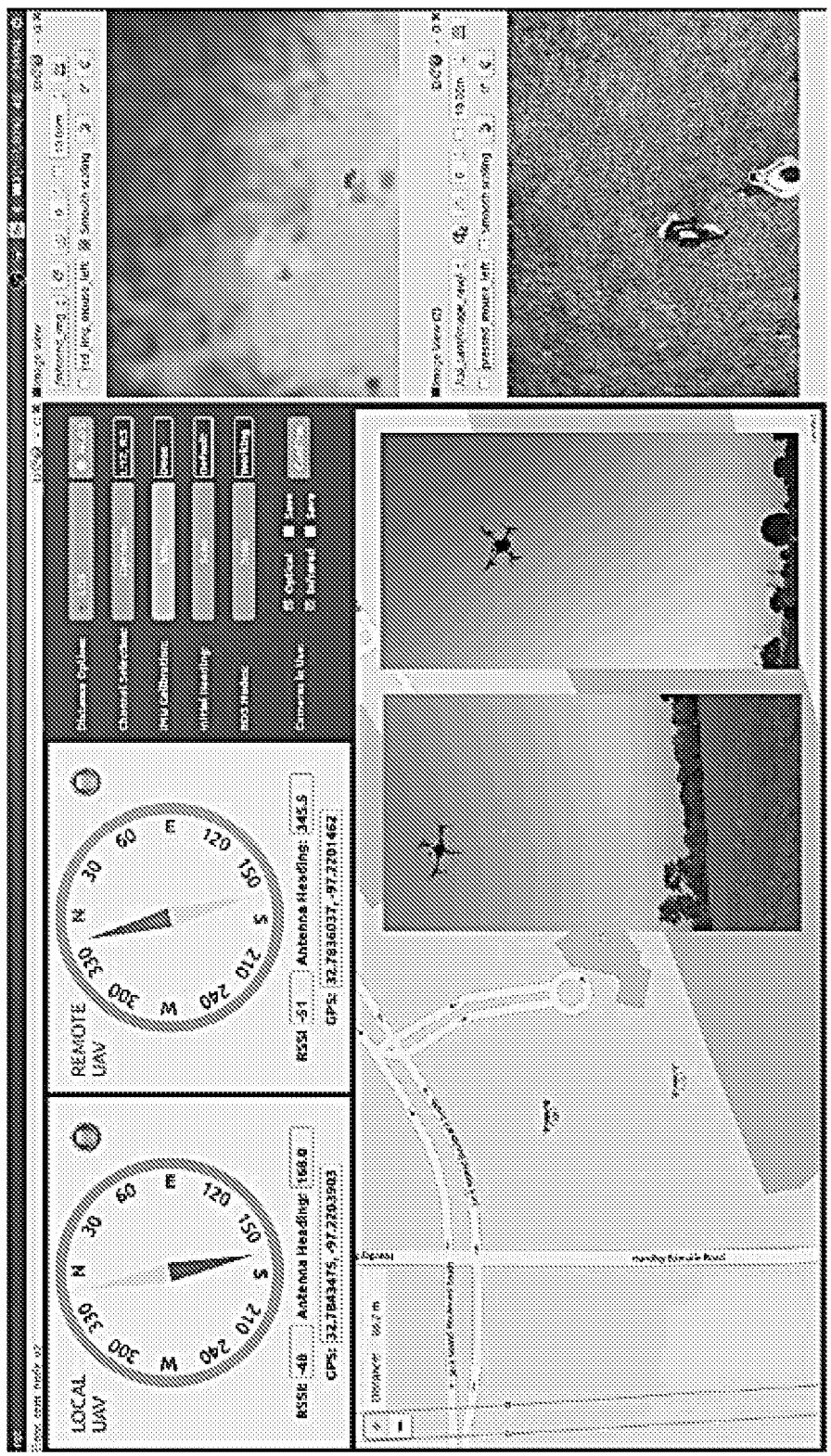
FIG. 9 shows a snapshot of an exemplary user-friendly interface graphical design in accordance with embodiments of the present disclosure.

A user-friendly graphical user interface (see FIG. 9) automates the configuration, operation, and diagnosis procedures. In an exemplary embodiment, the interface displays the locations of UAVs, communication quality, antenna alignment performance, and real-time videos. In addition, control operations are included to automate the intricate configuration processes, lowering the burden for users such as emergency staff.

In various embodiments, the graphical user interface (GUI) is developed using Qt, a cross-platform application framework and widget toolkit. Qt supports all major desktop platforms and most mobile or embedded platforms. Its advantages include fast and simple programming, consistent and comprehensive APIs and libraries, and compatibility with various compilers.

An exemplary interface of the improved ACDA system is composed of four parts, including the message input and display, map, infrared and optical video display, and control panel. The message input and display support multiple functions. First, it displays information of the local and remote compasses, GPS, RSSIs and antenna headings retrieved from the onboard ACDA system. In one embodiment, the local antenna heading angle is marked on a compass dial in red, and the remote antenna heading is marked on the compass dial in blue. The GPS, RSSI, and desired antenna heading angles are displayed in text boxes. In addition, two circle indicators on the right side of the compass dials show the connection qualities of the ACDA system on the local side and the remote side respectively, where green denotes connection established and red denotes connection lost. Second, the text boxes of GPS and antenna heading angles can also serve as input boxes. If GPS or desired heading angle is known in advance, users can input it directly to the corresponding text box and pressing "Enter."

The map displays the geographic information of the local and remote UAVs using OpenStreetMap (OSM), an open source mapping toolkit. In one embodiment, a red UAV icon represents the location of the local UAV, and a blue UAV icon represents the location of the remote UAV. The distance between them is displayed on the upper left corner of the map. The video display shows the real-time infrared and optical videos transmitted from the remote side. Some function keys can be used to adjust the images, such as refresh, resize, and rotate. The control panel contains six control operations, each having several widgets that facilitate user operations illustrated below.

Figure 10:
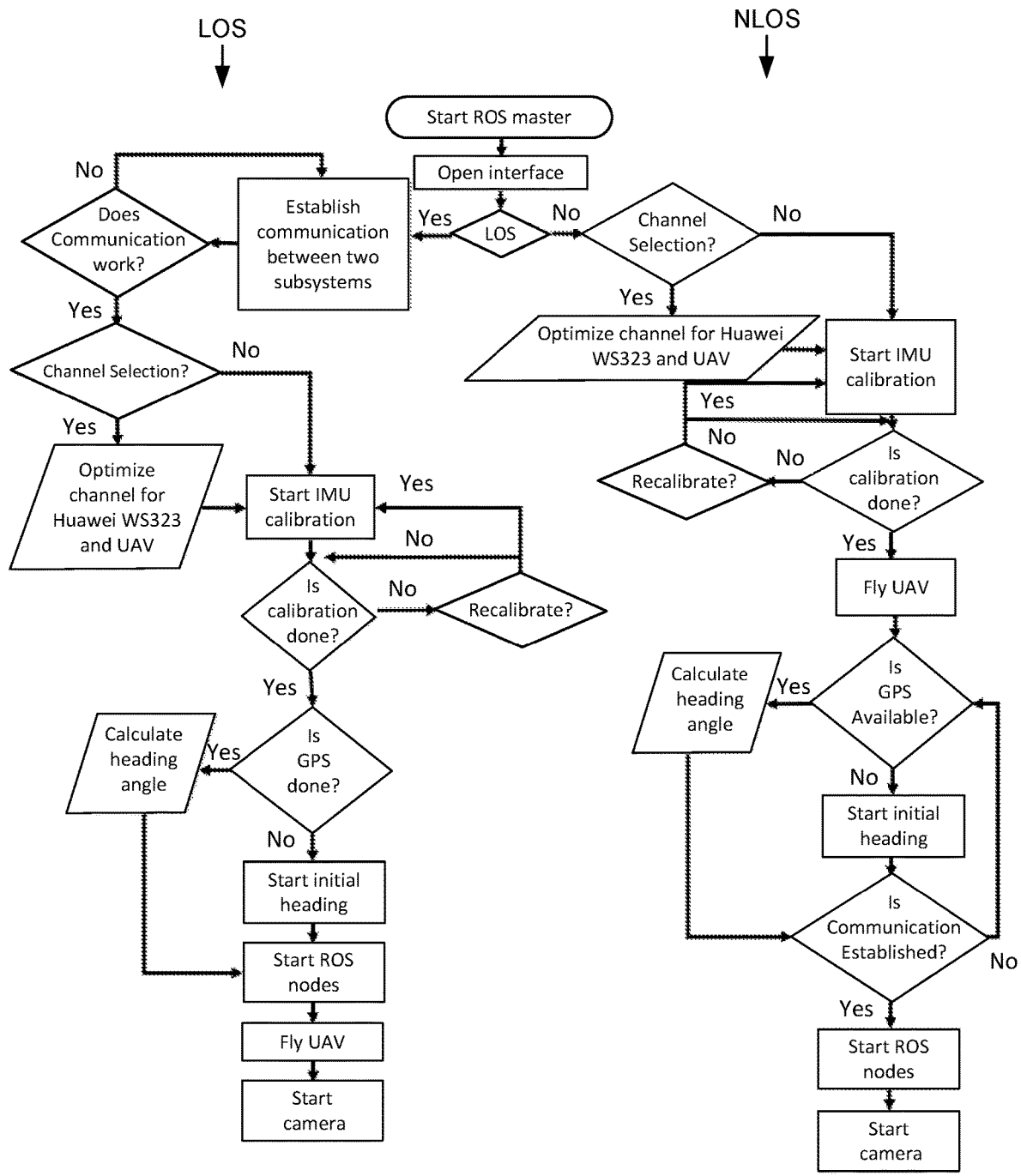
FIG. 10 shows a flow chart of operations for an exemplary improved ACDA system that are available to be performed using an exemplary graphical user interface in accordance with embodiments of the present disclosure.

FIG. 10 shows an exemplary flowchart of operations for the improved ACDA system 200 that are available to be performed using the graphical user interface. For the control operation of distance mode selection, there are two modes: line-of-sight (LOS) (certain operations of which are shown on left side of figure) and non-line-of-sight (NLOS) (certain operations of which are shown on right side of figure). In an exemplary implementation of the LOS mode, the local and remote ACDA subsystems are within a short range (100-200 m) and there is no obstruction between them, and, therefore, the communication of the improved ACDA system 200 can be established without alignment. In the NLOS mode, either the distance between the UAVs 230, 235 is beyond the short range or the signals of the two systems are blocked by obstructions in between. When LOS is chosen, the antennas alignment can be completed on the ground for optimal communication performance. When NLOS is chosen, the antenna alignment starts after UAVs 230, 235 are launched to the air, because attenuation, reflection, diffraction, and penetrations do not permit the alignment on the ground.

For the control operation of channel selection, once the "Optimize" button is clicked, the Wi-Fi channel selection algorithm described in Algorithm 1 is implemented and the optimized channels which avoid mutual interference selected on the local and remote sides are displayed in the text box to the right.

For the control operation of IMU (inertial measurement units) calibration, the IMU calibration is automated. Its purpose is to eliminate magnetic interference of the environment. Once the "Run" button is clicked, the IMU calibration begins, "Run" becomes "Stop," and the text box to the right shows "Working." One can stop the IMU calibration at any time by clicking the button again. When the IMU calibration is complete, the text box to the right shows "Done."

For the control operation of initial heading selection, this setting is used in a GPS denied environment such as indoors to align directional antennas 242 by exhausting various pairs of heading angles at the local and remote sides to find the maximum RSSI. The button has two functions, "Scan" and "Stop." The text box to the right shows three states: "Default," "Working," and "Done." "Default" means that the GPS is available in the current scenario, so that the initial heading selection step can be skipped. "Working" and "Done" are shown when the initial heading scan is triggered and completed, respectively.

For ROS node operations, similar to the button for IMU calibration, the button of ROS nodes has two functions: "Run" and "Stop," with corresponding states, "Working" or "Done," displayed in the text box to the right. Once the ROS nodes are activated, topics are created, and messages are exchanged among functional modules of the local and remote ACDA subsystems.

For controlling operations of cameras in use, four check boxes are included for the infrared and optical cameras. Once a camera is checked, the real-time video captured by this camera will be displayed on the right. When "Save" is checked, the video will also be stored in the local laptop.

In various embodiments, a water-resistant enclosure design of the improved ACDA system is provided for the emergency response operations, as shown in FIG. 4. The water-resistant enclosure contains two parts: the cover for the antenna 242 which can rotate a full 360 degrees, and the cover for the other components, including battery, communication 240, 245, computing 250, 255, and control components 260, 265. It supports both a static seal (e.g., a static radial seal) and a dynamic seal (e.g., a rotary seal). In various embodiments, the enclosure is printed using a 3D printer with Acrylonitrile Butadiene Styrene (ABS) plastic.

To aid in discussion of the controller design, the ACDA system model including the UAV and directional antenna dynamics are discussed first. Accordingly, two UAVs 230, 235 are designed to operate at approximately the same height. The positions of the UAV$_i$ along x and y axes at time instant k are denoted as x$_i$[k] and y$_i$[k] respectively. The dynamic of UAV (denote as f$_i$(·)) is described as:

$$x_i[k+1]=x_i[k]+v_i[k]\cos(\phi_i[k])\delta,$$

$$y_i[k+1]=y_i[k]+v_i[k]\sin(\phi_i[k])\delta,$$

$$\phi_i[k+1]=\phi_i[k]+\omega_i[k]\delta, \quad (1)$$

where $\delta$ is the sampling period, and $\phi_i[k]$ & $\omega_i[k]$ are the heading angle and angular velocity of UAV i at time instant k respectively.

The directional antenna 242 installed on each UAV adjusts its heading angle automatically to establish the robust A2A communication channel. The heading angle dynamics of its directional antenna are described as:

$$\theta_i[k+1]=\theta_i[k]+(\omega_i^*[k]+\omega_i[k])\delta, \quad (2)$$

where $\theta_i$ is the heading angle of antenna i, and $\omega_i^*$ is the angular velocity of antenna i due to its heading control. Note that both the control of antenna i ($\omega_i^*$) and the movement of UAV. ($\omega_i$) contribute to the change of $\theta_i$.

In an exemplary embodiment, two measurement models are included, one for GPS, and the other for RSSI, and the communication performance indicator RSSI is adopted to assist with the distributed antenna controller design.

The measurement of the GPS signal $Z_{G,i}(k)$, can be described as:

$$Z_{G,i}[k]=H_{G,i}(k)X_i[k]+\overline{\omega}_{G,i}[k], \quad (3)$$

where $H_G$ is the measurement matrix, $H_{G,i}=[1, 0, 0, 0; 0, 1, 0, 0]$. $X_i[k]=[x_i[k], y_i[k], \phi_i[k], \theta_i[k]]^T$ is the system state of UAV$_i$, and $\overline{\omega}_{G,i}$ is the white Gaussian noise with zero mean and covariance $R_{G,i}$. GPS signals can be transmitted through the A2A communication channel to assist with the control of the directional antennas.

RSSI measures the performance of the A2A communication channel. In an exemplary improved ACDA system that is equipped with two directional antennas, RSSI is affected by (1) the relative positions of the two UAVs 230, 235 that carry the directional antennas 242, (2) the headings of these antennas 242, and (3) the field radiation patterns of the antennas 242 in a specific communication environment. The RSSI signal $Z_R[k]$ can be derived from the Friis free space equation as:

$$Z_R[k]=P_{t|dBM}[k]+G_{t|dBi}+20\log_{10}(\lambda)-20\log_{10}(4\pi)-20\log_{10}(d[k])+\overline{\omega}_R[k], \quad (4)$$

where $P_{t|dBm}[k]$ is the transmitted signal power, $\lambda$ is the wavelength, d[k] is the distance between the two UAVs at time k, and $d[k]=\sqrt{(x_1[k]-x_2[k])^2+(y_1[k]-y_2[k])^2}$. $\overline{\omega}_R[k]$ is the white Gaussian noise with zero mean, and $G_{t|dBi}[k]$ is the sum of the transmitting and receiving antenna gains. For the Ubiquiti NanoStation loco M5 directional antennas that are used in an exemplary improved ACDA system 200, $G_{t|dBi}[k]$ is modeled based on the filed pattern of the end-fire array antennas:

$$G_{t|dBi}[k] = \quad (5)$$

$$(G_{t|dBi}^{max} - G_{t|dBi}^{min}) \times \sin\frac{\pi}{2n}\left|\frac{\sin\left(\frac{n}{2}(k_a d_a(\cos(\gamma_t[k] - \theta_t[k]))-1) - \frac{\pi}{n}\right)}{\sin\left(\frac{1}{2}(k_a d_a(\cos(\gamma_t[k] - \theta_t[k]))-1) - \frac{\pi}{n}\right)}\right| +$$

$$(G_{r|dBi}^{max} - G_{r|dBi}^{min}) \times \sin\frac{\pi}{2n}\left|\frac{\sin\left(\frac{n}{2}(k_a d_a(\cos(\gamma_r[k] - \theta_r[k]))-1) - \frac{\pi}{n}\right)}{\sin\left(\frac{1}{2}(k_a d_a(\cos(\gamma_r[k] - \theta_r[k]))-1) - \frac{\pi}{n}\right)}\right| +$$

$$G_{t|dBi}^{min} + G_{r|dBi}^{min},$$

where $G_{t|dBi}^{max}$, $G_{t|dBi}^{min}$, $G_{r|dBi}^{max}$, $G_{r|dBi}^{min}$ are the maximum and minimum gains of transmitting and receiving antennas, $k_a$ is the wave number, where $$k_a = \frac{2\pi}{\lambda}.$$

n and $d_a$ are parameters decided by the design of the antenna. $\theta_t[k]$ and $\theta_r[k]$ are the heading angles of the transmitting and receiving antennas at time k. $\gamma_t[k]$ and $\gamma_r[k]$ are the heading angles of the transmitting and receiving antennas corresponding to the maximal $G_{t|dBi[k]}$ at time k.

The parameters $G_{t|dBi}^{max}$, $G_{t|dBi}^{min}$, $G_{r|dBi}^{max}$, $G_{r|dBi}^{min}$ can be obtained from the antenna's data sheet in an ideal environment. In an exemplary improved ACDA system 200, $G_{t|dBi}^{max}=G_{r|dBi}^{max}$ and $G_{t|dBi}^{min}=G_{r|dBi}^{min}$ hold because the two directional antennas 242 are of the same type. In an imperfect environment where disturbances and interference exist, the parameters in $G_{t|dBi[k]}$ can be environment-specific.

In addition, $\gamma_t[k]$ and $\gamma_r[k]$ can be obtained from the alignment of the two directional antennas. In an imperfect environment, such as blockages, the desired heading angles can be captured by:

$$\gamma_r[k] = \arctan\frac{y_t[k] - y_r[k]}{x_t[k] - x_r[k]} + \theta_{env}, \quad (6)$$

where (x$_t$[k] and y$_t$[k]) and (x$_r$[k] and y$_r$[k]) are the positions of UAVs that carry the transmitting and receiving antennas respectively, and $\theta_{env}$ is an environment-specific shift angle. $\theta_{env}=0$ in a perfect environment.

A principal objective of an exemplary improved ACDA system is to find the directional antennas' optimal heading angle velocities to maximize the RSSI performance over a look-ahead window, and thus, to maximize the performance of the UAV-to-UAV communication channel. The RSSI model (as described in Equations (4)-(6)) contains unknown environment-specific parameters, i.e., $G_{t|dBi}^{max}$, $G_{t|dBi}^{min}$, and $\theta_{env}$.

Here, the problem can be formulated as an optimal control problem. Mathematically, considering the system dynamics described in Equations (1) and (2), an optimal control policy U[k] can be sought to maximize the following value function:

$$V(X[k])=\Sigma_{l=k}^{k+N}\alpha^{l-k}Z_R[l](X[l],U[k]), \quad (7)$$

where X[k] is the global state, $X[k]=[X_1^T[k],X_2^T[k]]^T$, $X_i[k]=[x_i[k], y_i[k], \phi_i[k], \theta_i[k]]^T$. U[k] is the control input, $U[k]=[U_1[k], U_2[k]]^T$ and $U_i[k]=[\omega_i^*[k]]$. $\alpha\in(0,1]$ is a discounter factor, and $Z_R[l]$ is the RSSI signal at time l. Note that the control is decentralized. Each directional antenna finds its own optimal control policy with the assumption that the other antenna adopts its optimal control policy. In this way, the control solution for one of the UAVs (denoted as the local UAV, or UAV$_1$) is developed. Likewise, the control solution for the other UAV (the remote UAV, or UAV$_2$) is designed in the same manner.

To solve the optimal control problem formulated above, an adaptive optimal controller is developed based on reinforcement learning. Note that the value function (described as Equation (7)) can be rewritten as:

$$V(X[k]) = Z_R[k](X[k], U[k]) + \Sigma_{l=k+1}^{k+N} \alpha^{l-k} Z_R[l](X[l], U[k]), \quad (8)$$

To solve the above equation, various embodiments of the computing component 250, 255 utilize the RL method—in particular, the policy iteration (PI) algorithm. The PI algorithm contains two steps: policy evaluation and policy improvement. The policy evaluation step is designed to solve the value function V(X[k]) using Equation (8), given the current control policy. The policy improvement step is to maximize the value function by finding the optimal control policy. The two steps are conducted iteratively until convergence.

Policy Evaluation $$V_{j+1}(X[k]) = Z_R[k](X[k], U[k]) + \Sigma_{l=k+1}^{k+N} \alpha^{l-k} Z_{j,R}[l](X[l], U[k]), \quad (9)$$

Policy Improvement $$U_{j+1}(X[k]) = \underset{U_j[k]}{\mathrm{argmax}}\, Z_R[k](X[k], U[k]) + \sum_{l=k+1}^{k+N} \alpha^{l-k} Z_{j+1,R}[l](X[l], U[k]), \quad (10)$$

where j is the iteration step index, and $Z_{j,R}[l](X[l]), U[k])$ is the RSSI model with parameters learned in the jth iteration step.

Note that three unknown parameters for the environment-specific RSSI model ($G_{rldBi}^{max}$, $G_{rldBi}^{min}$, $\theta_{env}$) are involved in Equation (9), and need to be learned or determined. In particular, for each iteration j, three time steps (k, k+1, and k+2) are needed to come up with three equations to iteratively solve for the three parameters. To solve the nonlinear equations, the Newton's method is utilized. The idea of Newton's method is described as follows. An initial guess which is reasonably close to the true root is first given, and the function is then approximated at the given initial guess by its tangent line. After computing the x-intercept of this tangent line, which is typically a better approximation to the function's root than the original guess, the function is approximated again at the derived x-intercept until the accuracy meets a desired requirement.

Figure 11:
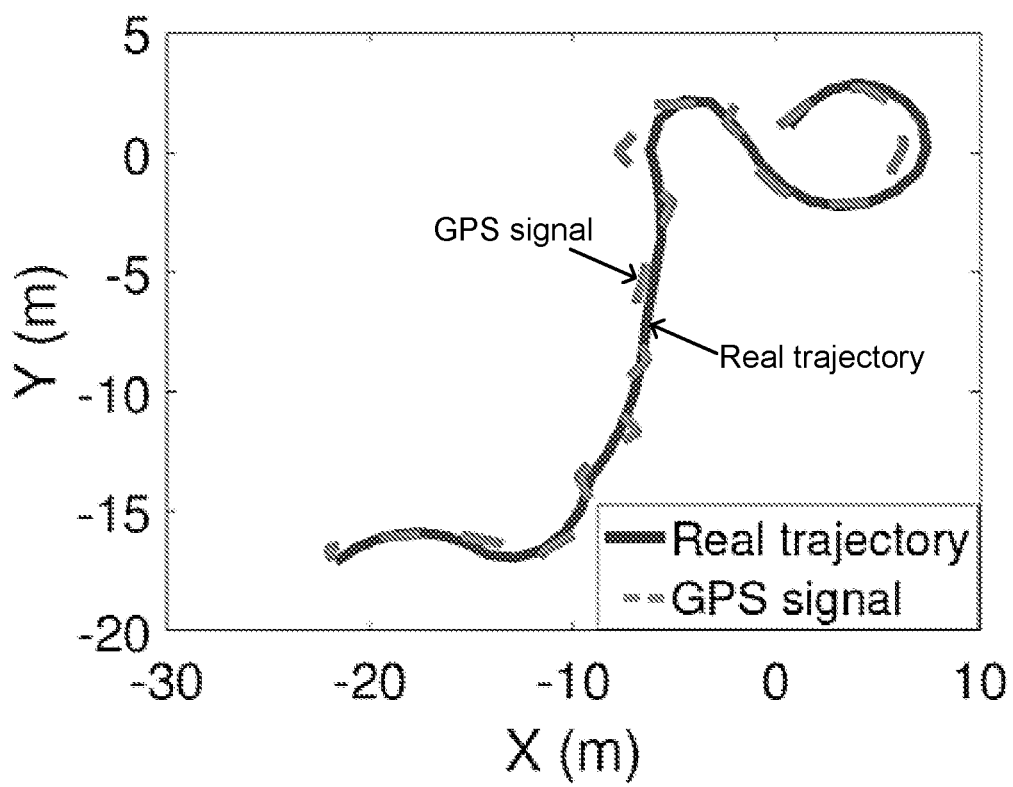
FIGS. 11-12 show plots of (A) a trajectory of local UAV and a trajectory of remote UAV, respectively, for evaluation of an exemplary embodiment of the improved ACDA system.
Figure 12:
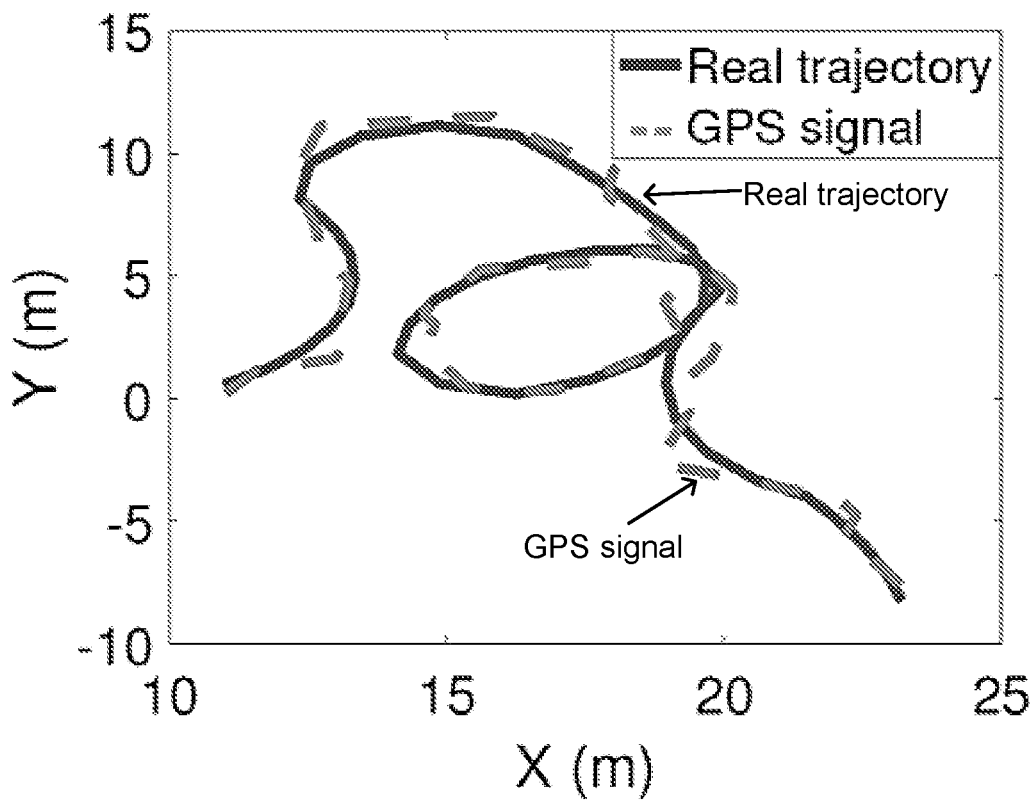

To illustrate and validate the antenna controller design, simulation studies were conducted, in which two UAVs are simulated to move in a 2-D airspace, each equipped with a directional antenna. The total simulation time is T=45 s, with the sampling period δ=1 s. The parameter N in Equation (7) is selected as 1 here (i.e., with the goal of maximizing the current RSSI). The transmitting power is $P_{rldBm}$=23 dBm, and the electromagnetic wavelength is λ=0.052 m. For the parameters in Equation (5), the design parameters n=8 and $$k_a = \frac{\lambda}{4}$$

are selected. FIGS. 11 and 12 show the trajectories of the local UAV and remote UAV respectively. The solid curve and the dashed curve are the real trajectory and the GPS measurements respectively. Gaussian noises are added to the GPS signals.

Figure 13:
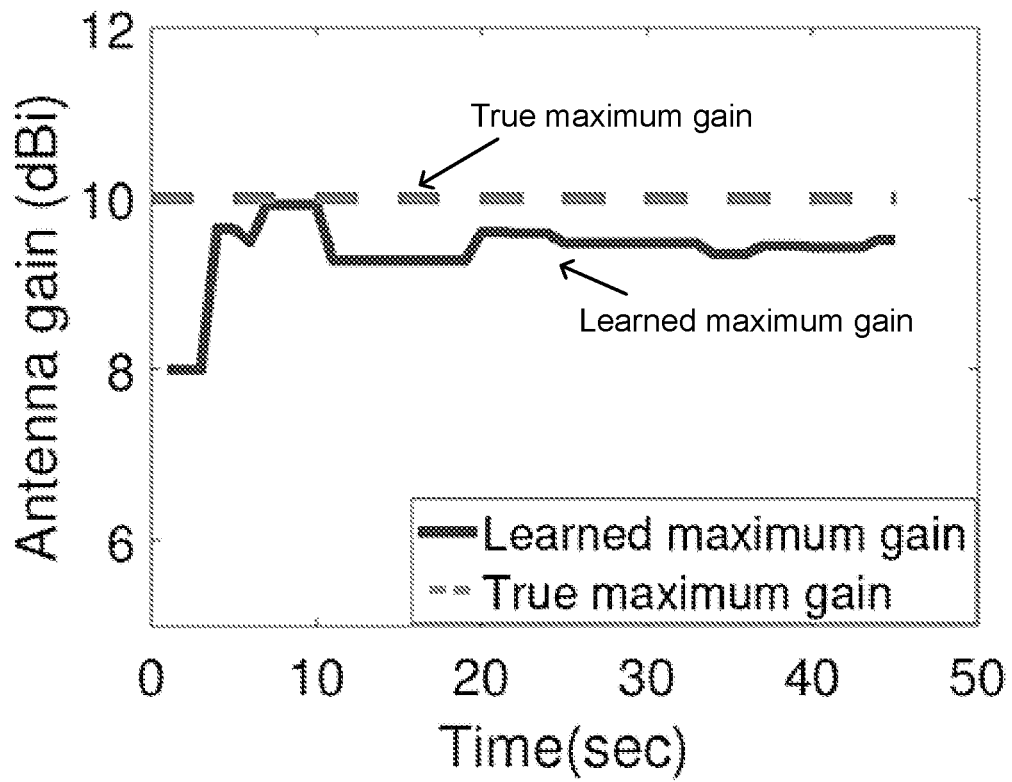
FIGS. 13-14 show plots of a learned environment-related maximum directional antenna gain and a shift angle, respectively, for evaluation of an exemplary embodiment of the improved ACDA system.
Figure 14:
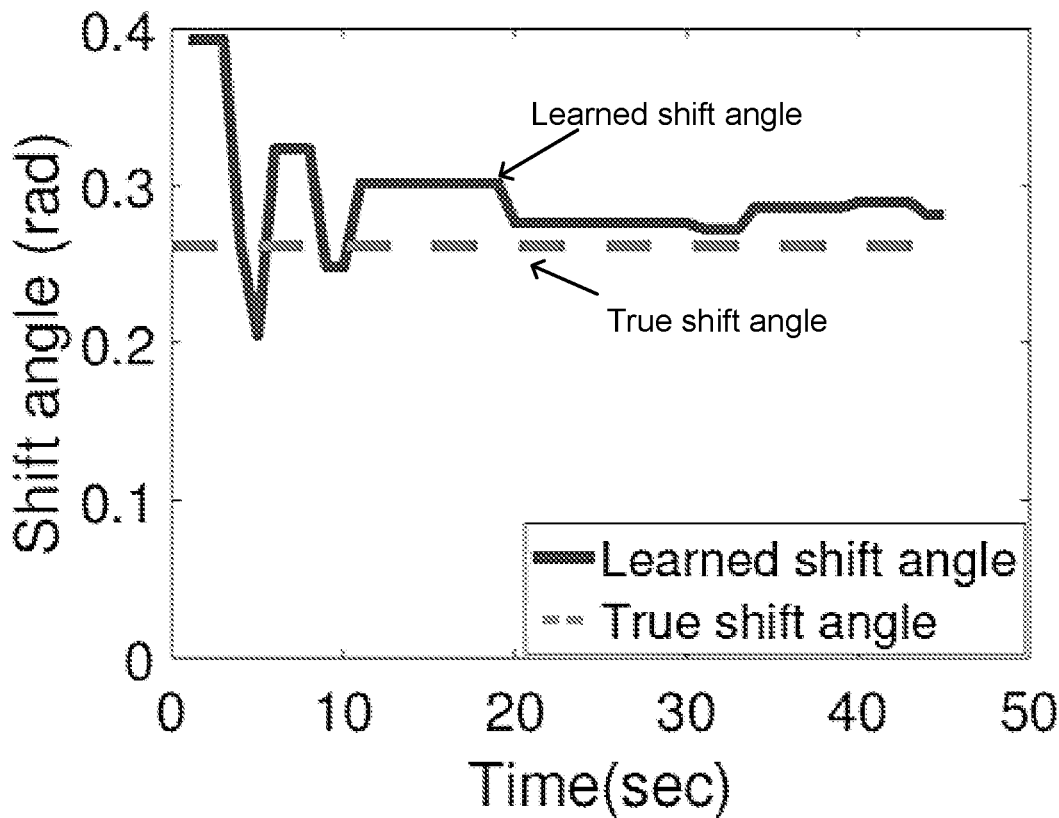
Figure 15A:
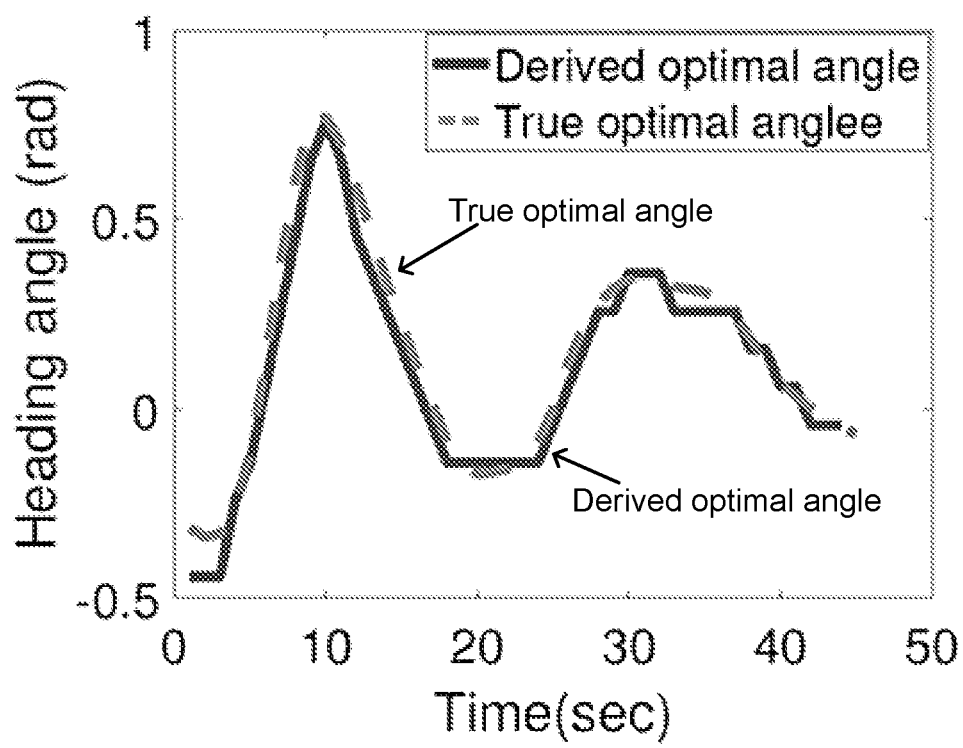
FIGS. 15A-15B show plots of (A) derived optimal heading angles and (B) heading angle errors between the derived angles and the true optimal angles for evaluation of an exemplary embodiment of the improved ACDA system.
Figure 15B:
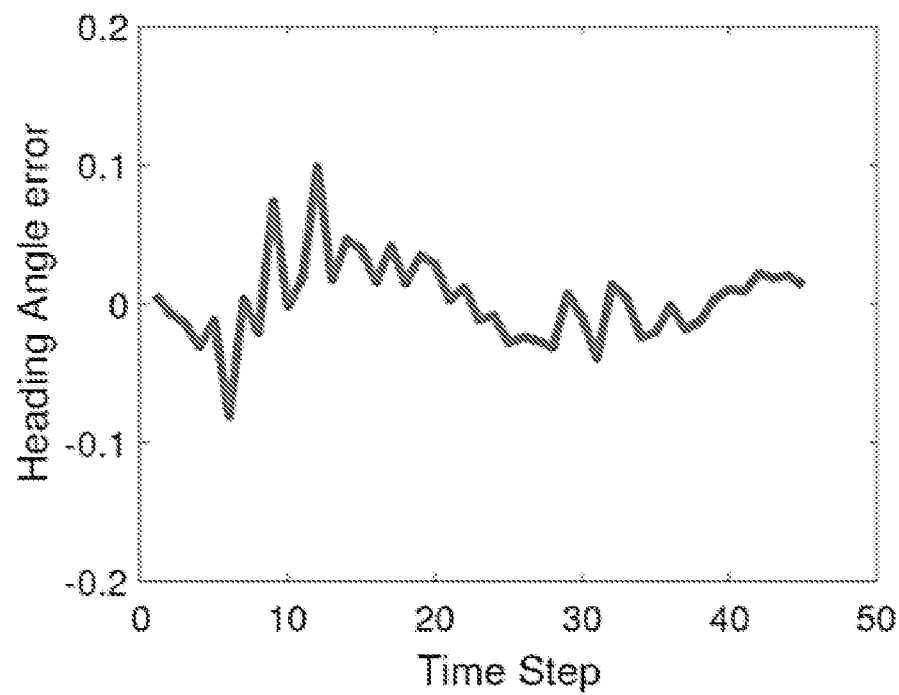

With these randomly generated UAV trajectories, the RL-based control algorithm is simulated. To simulate the long-distance communication scenario, the minimum received signal strength is assumed to be 0, and in this case, the minimum directional antennas' gain ($G_{rldBi}^{min}$) can be calculated accordingly. FIGS. 13 and 14 show the learned environment-specific antennas' maximum gain ($G_{rldBi}^{max}$) and the shift angle caused by the environment ($\theta_{env}$) respectively. Gaussian noises are added to the RSSI measurements. As shown in the figures, the learned parameters are very close to their true values, which indicates the effectiveness of the learning algorithm. FIGS. 15A and 15B show the derived optimal heading angles of the local directional antenna 242 and the angle errors between the derived optimal heading angle and the true optimal heading angles. The derived optimal heading angles are very close to the true optimal angles, indicating the good performance of the RL-based control algorithm.

For evaluation purposes, two field tests were conducted to verify the exemplary ACDA solution for the improved ACDA system, in which the first field test is to verify the RSSI model and the second field test is to test the performance of the antenna control algorithm through a comparative study with the sole GPS-based control algorithm described in the Chen paper.

The RSSI model was first tested for a pair of directional antennas, as described in Equations (4) and (5). The distance between the two directional antennas was 43 m, the transmitting power was 23 dBm, and the electromagnetic wave frequency was 5.8 GHz. With the same environment and test settings, two tests were then conducted to check the properties of the two directional antennas. In the first test, the remote antenna pointed towards the local antenna and kept a fixed heading angle throughout the test. The local antenna initially pointed towards the remote antenna and then rotated 15° per 90 seconds until 360°. The RSSI was collected by the local antenna and was averaged during each 90 seconds. In the second test, the heading angle of the local antenna was fixed, and pointed towards the remote antenna. The remote antenna initially pointed towards the local antenna and rotated 15 degrees per 90 seconds until 360°. The RSSI collected by the remote antenna was also averaged in the second test.

Parameters in the RSSI model were estimated from the measured data: n=8, $$d_a = \frac{\lambda}{4},$$

Figure 16A:
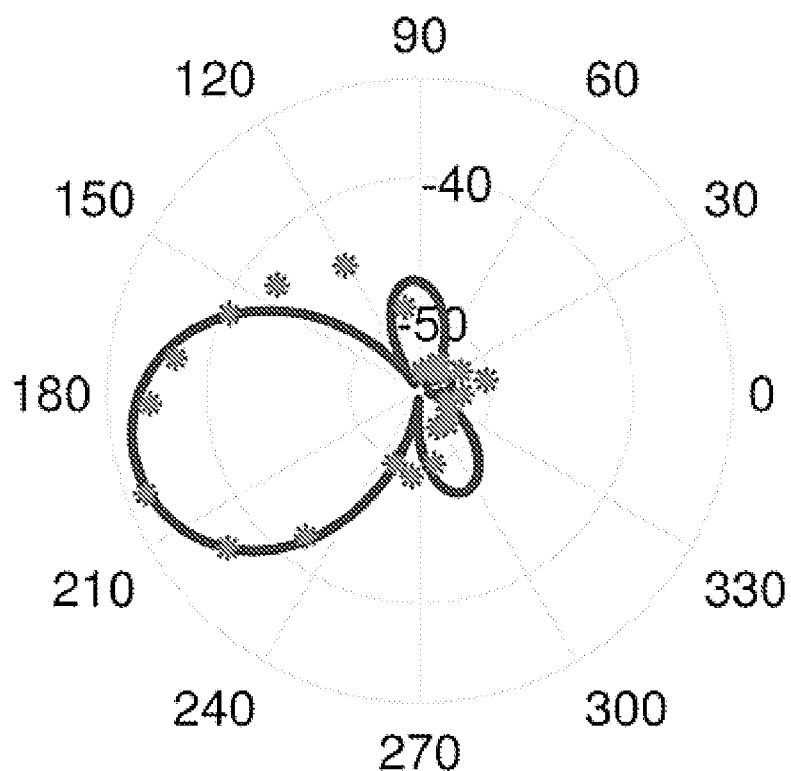
FIGS. 16A-16B shows plots of received signal strength indicator (RSSI) mapping in (A) a test of a local UAV and (B) a test of a remote UAV for evaluation of an exemplary embodiment of the improved ACDA system.
Figure 16B:
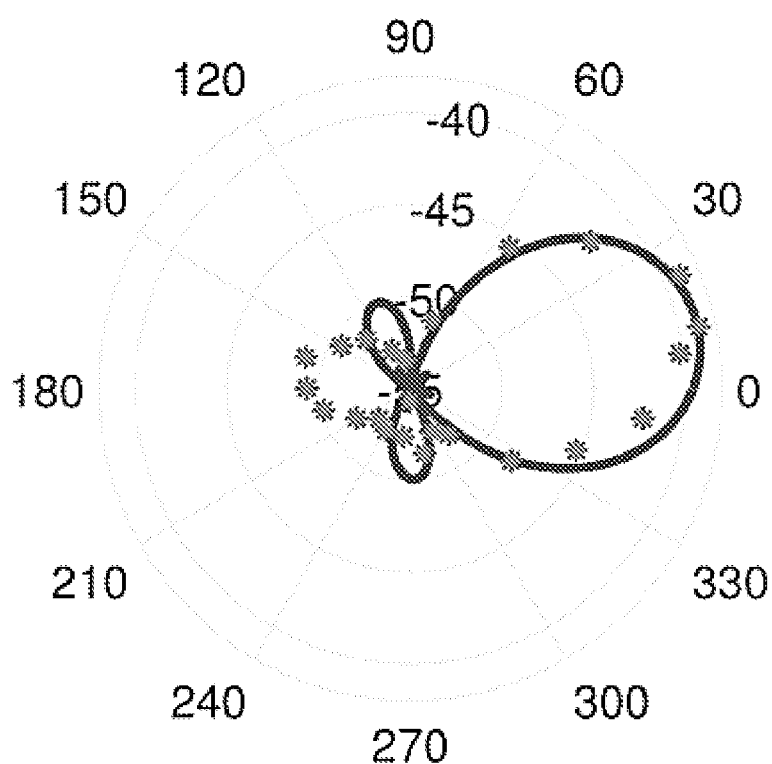

$G_1^{max}$=11.5 dBi, $G_1^{min}$=−8.5 dBi for the local antenna, and $G_2^{max}$=9 dBi, $G_2^{min}$=−8 dBi for the remote antenna. FIGS. 16A and 16B show the test results in (a) the first test and (b) the second test. The dots or asterisks represent the measured RSSI signal, and the solid curves represent the relation between the RSSI signal and the rotation angle according to Equations (4) and (5). The measured RSSI signal matched reasonably well with the learned RSSI model.

An exemplary RL-based control algorithm was also tested. In this preliminary testing, the local directional antenna 242 was at a fixed location, and the remote antenna changed its location every 90 seconds. Each antenna 242 determined its own optimal heading angle at each location according to an exemplary distributed RL-based control algorithm to optimize the RSSI performance. The RSSI was measured at both antennas 242 with the derived heading angles. To provide a comparison, the GPS alignment-based control algorithm, as proposed in the Chen paper, was also tested, in which each antenna pointed toward the GPS location of the other controller and RSSI was not used as a measurement signal. The testing results are summarized in Table 1 (below).

TABLE 1

| Position | Control | Local Antenna | | Remote Antenna | |
| --- | --- | --- | --- | --- | --- |
| | | RSSI | Heading | RSSI | Heading |
| 1 | RL | −37 dBm | 194.1° | −41 dBm | 16.4° |
| | GPS | −45 dBm | 170.6° | −45 dBm | 35.5° |
| 2 | RL | −37 dBm | 197.3° | −39 dBm | 15.1° |
| | GPS | −39 dBm | 176.2° | −42 dBm | 357.8° |
| 3 | RL | −39 dBm | 191.1° | −44 dBm | 13.2° |
| | GPS | −41 dBm | 182.6° | −44 dBm | 6.2° |
| 4 | RL | −35 dBm | 196° | −39 dBm | 15.2° |
| | GPS | −38 dBm | 195.8° | −39 dBm | 16.2° |
| 5 | RL | −35 dBm | 194.9° | −39 dBm | 15.4° |
| | GPS | −37 dBm | 186.1° | −39 dBm | 7.5° |

In Table 1, at each of five locations or positions, two control algorithms were tested. "RL" in Table 1 represents the RL-based control algorithm and "GPS" means the GPS alignment-based control algorithm. From the table, the RL-based algorithm demonstrates a better RSSI, as compared to the GPS alignment-based algorithm, in all five locations. Thus, the testing results verify that the RL-based control algorithm outperforms the GPS alignment-based algorithm.

Figure 17:
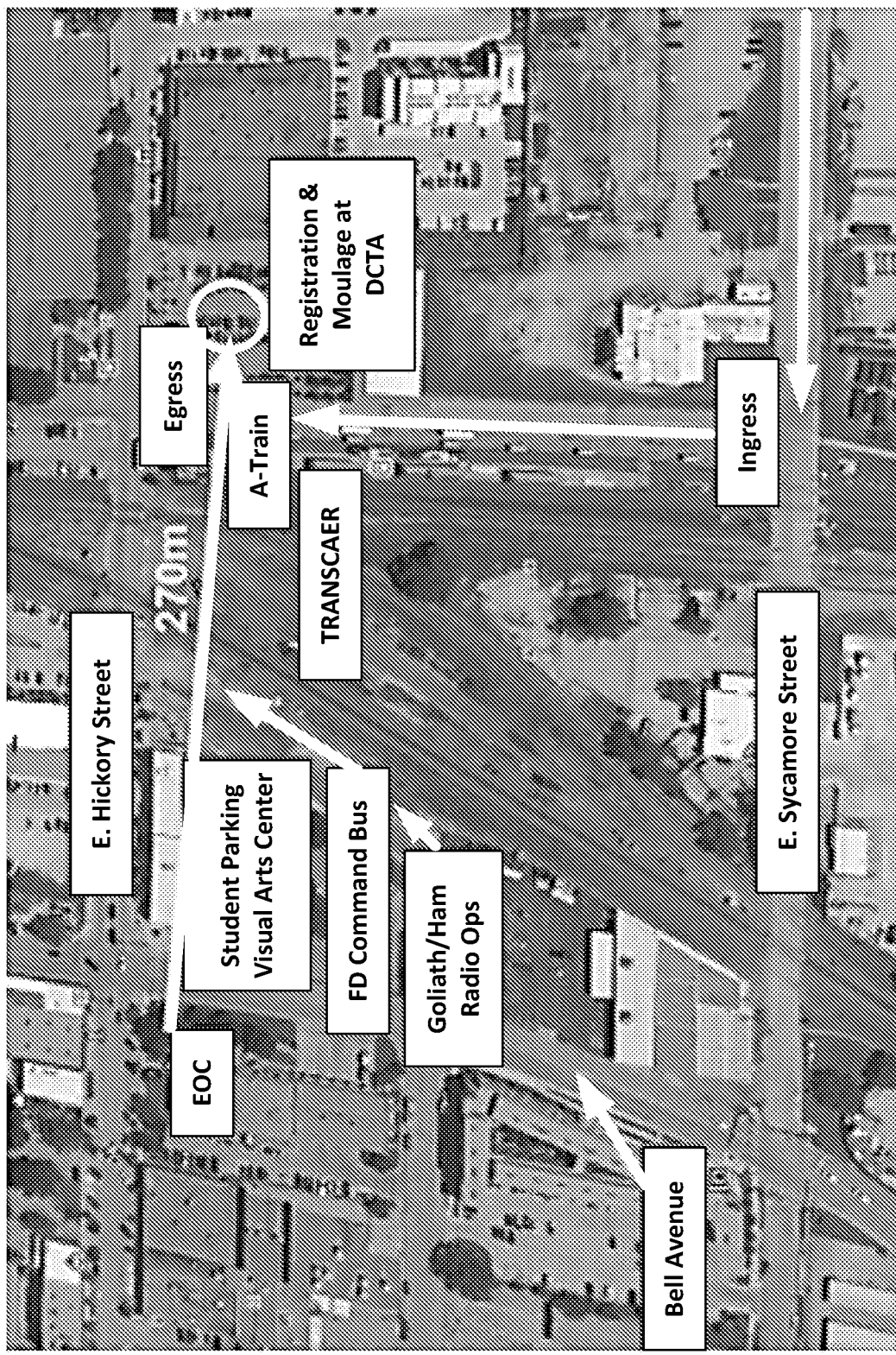
FIG. 17 shows a map demonstrating a disaster drill performed with an exemplary ACDA system in accordance with various embodiments of the present disclosure.

Additionally, the performance of an exemplary improved ACDA system was tested through a participation in a full-scale emergency drill of the City of Denton, Tex. In particular, on a rainy day in May 2018, a full-scale disaster drill on a train-involved accident was conducted with the lead of the Denton Fire Department. For the drill, passengers on the train piled out of the train with a great panic that resulted in injuries and fatalities. An exemplary improved ACDA system, in accordance with embodiments of the present disclosure, successfully responded to the emergency and sent back real-time monitoring videos of the emergency zone to the emergency management center for condition assessment. For example, an emergency management center can display remote infrared and optical monitoring videos. Correspondingly, FIG. 17 shows a map of this disaster drill, in which the distance between the local and the remote UAVs is about 270 m, which is beyond the nominal Wi-Fi range.

The present disclosure demonstrates a new and improved long-range broadband ACDA system 200 which seamlessly integrates the communication 240, 245, control 260, 265, and computing components 250, 255 of the ACDA system 200. In various embodiments, the communication component 240, 245 features a directional-antenna equipped UAV-to-UAV channel that shares the transmissions of the application data, control and commands, and the autonomous directional antenna control that focuses the energy and significantly extends the communication distance with reduced interference. The computing 250, 255 and control components 260, 265 feature the use of RSSI, a communication performance indicator, to assist with the antenna control to achieve optimal communication performance, and an RL-based control algorithm that learns the communication model in an unknown environment. The simulation studies, field tests, and disaster drills verify the performance of the system. Thus, an exemplary improved ACDA system 200 can be broadly used to provide on-demand broadband and long-distance UAV-to-UAV communication and service to the ground in places where communication infrastructures do not exit. It is also contemplated that an exemplary improved ACDA system 200 can use phase-array-based electronically controlled directional antennas that have multiple controllable narrow beams to extend the solution to multi-UAV communication.

In accordance with embodiments of the present disclosure, a unified communication channel is provided for application, control, and command data. As controls and commands cannot be transmitted if the directional communication channel fails, in various embodiments, the antennas control system is utilized to be able to robustly lock and track the other directional antennas, once the communication channel is established initially. To do that, an uncertain UAV mobility modeling and intention estimation framework has been developed to capture and predict the uncertain intentions of the remote UAV's maneuvers. Predictive intention mechanisms for robot-robot and human-robot collaborations have been studied, in which most studies assume that an agent's intention can be described and modeled in a deterministic and predictable form, which is not suitable for UAVs considering their highly flexible and random movement patterns. Probabilistic intentions and their estimation have also been studied, using stochastic models such as Markov chain and Bayesian networks. In the present disclosure, random mobility models (RMMs) are used, and in particular, the smooth turn UAV RMM is used to more realistically capture the uncertain mobility intentions of UAVs, where RMMs are a class of random switching models that capture the statistics of random moving objects. The intelligence on RMMs can be exploited to facilitate robust tracking.

In accordance with embodiments of the present disclosure, an exemplary antenna control adopts a novel stochastic optimal control approach that integrates Reinforcement Learning (RL) for online optimal control, Multivariate Probabilistic Collocation Method (MPCM) for effective uncertainty evaluation, and Unscented Kalman Filter (UKF) for nonlinear state estimation. On the aspect of optimal control, prior works on the RL in optimal control problems have been developed for deterministic system dynamics and have developed the stochastic optimal control solution that integrates MPCM and RL methods for systems modulated by uncertainties. In such works, the uncertainties are relatively simple, as compared to the more complicated random switching RMMs considered in the present disclosure. On the aspect of estimation, nonlinear system estimation methods such as Extended Kalman Filter (EKF) and UKF have been widely used typically for known and deterministic systems corrupted with additive noises, instead of the random switching RMM dynamics used in the present disclosure. Due to the limitations in the existing literatures, the present disclosure develops a new stochastic optimal control solution for systems that involve nonlinear random switching RMMs and limited measurements, by integrating UKF and RL with MPCM.

Regarding flight control commands, many Unmanned Aerial Vehicle (UAV) applications require beyond visual line of sight (BVLOS) control of UAVs. Examples include UAV-based nondestructive health monitoring of civil infrastructures and remote UAV-assisted emergency response. In accordance with embodiments of the present disclosure, a BVLOS control solution for a remote UAV is provided using a local UAV relay equipped with automatically aligned directional antennas. The use of the UAV relay permits flight control signals to be transmitted even if there exists blockages between the remote UAV and its operator. The use of directional antennas extends the UAV control distance to kilometers with high data throughput. Built upon an exemplary aerial communication system using directional antennas (ACDA) of the present disclosure, the hardware and software is designed to improve throughput and endurance. An exemplary BVLOS control solution includes a two-way relay communication, in which in one direction, low-resolution video views from the remote UAV are transmitted through the local UAV relay to help a UAV operator navigate the remote UAV, and in the other direction, UAV control signals are relayed through the local UAV and transmitted to the remote UAV for BVLOS operations.

Figure 18:
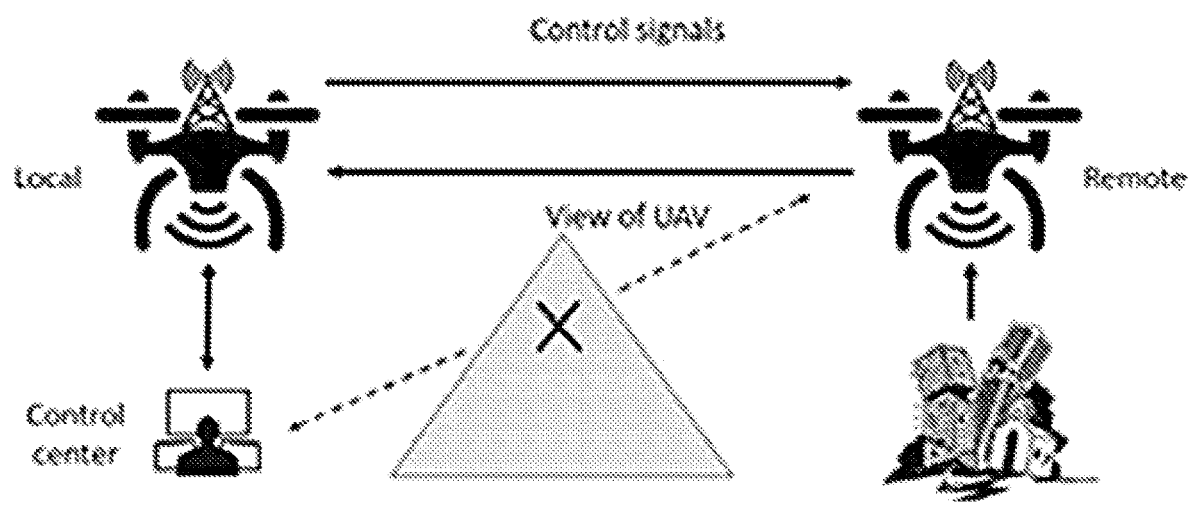
FIG. 18 shows an illustration of beyond visual line of sight (BVLOS) control of UAVs in accordance with various embodiments of the present disclosure.

In various embodiments, an exemplary BVLOS control solution for UAVs extends the operation range to kilometers and is not limited by blockages between an operator and UAV. FIG. 18 shows an exemplary BVLOS UAV control system that is based on a long-distance and broadband UAV communications, such as that offered by an exemplary ACDA system of the present disclosure. In accordance with the present disclosure, an improved ACDA system features a unified communication and control channel, an integrated design and implementation of communication, control and computing components, a user-friendly interface, and a reinforcement learning (RL)-based directional antenna control algorithm maximizes communication performance in unknown communication environments.

In certain embodiments of an exemplary ACDA system, each UAV is controlled locally by a UAV operator, where UAV control is within line of sight. However, in alternative embodiments, a remote UAV's control signal can be transmitted through the ACDA system to enable BVLOS operations. Accordingly, the use of a UAV relay permits flight control signals to be transmitted even if there exists blockages between the UAV and its operator, where the use of directional antennas extends the UAV control distance to kilometers with high data throughput.

In brief, an exemplary BVLOS control solution includes a two-way relay communication. In one direction, low-resolution videos from the remote UAV are transmitted through a local UAV relay to help the UAV operator navigate the remote UAV. The low-resolution videos can be utilized for the navigation purpose and provide situation awareness to UAV operators and also allow the operator to locate targets of interest, such as structural defects in health monitoring and victims in emergency response. In the other direction, UAV control signals are relayed through the local UAV and transmitted to the remote UAV for BVLOS navigation. High-resolution videos from the remote UAV can be stored in a storage card for further processing. In various embodiments, a remote control solution is configured to operate the remote UAV (e.g., using a keyboard) at the local side of the ACDA system. In various embodiments, to improve computing capability, NVIDIA Jetson TX2 Module (TX2) is selected as a processor for an exemplary ACDA system. In addition, Tarot 650 is selected as the UAV platform to remove the interference between the UAV platform (and in particular Carbon fiber propellers) and the communication system. To avoid the interference, a Pixhawk flight controller and plastic propellers (e.g., 13 inch) are selected with the Tarot 650 for certain embodiments of the ACDA system. Advantageously, the flight control signal link of Pixhawk operates at 72 MHz, which does not overlap with the Wi-Fi router so that there is no interference between them. By using plastic propellers, the interference potentially caused by carbon fiber propellers is avoided.

In accordance with various embodiments, an exemplary ACDA system has A2G/G2A, A2A, and A2C/C2A communication links. Two directional antennas form the A2A link, with an A2G/G2A link on each side provided by a WiFi router. The WiFi router also provides an A2C/C2A link by connecting with the built-in WiFi unit in TX2. Using these three types of wireless communication links, two TX2s on the local side and the remote side collect data from sensors and Pixhawks and publish the data to the ACDA system using a robot operation system (ROS).

In general, the computing component is responsible for all the computing tasks in the ACDA system. In particular, the component is responsible for obtaining data from sensors and the flight controller (e.g., Pixhawk), publishing obtained data to ROS, calculating the desired heading of antennas, and sending the motor's rotation direction & speed to the control component of the ACDA system.

The control component drives the geared motors to automatically align the two directional antennas. In various embodiments, the control component includes an Atmega2560 chip, a H-bridge motor driver, a geared DC motor, a magnetometer, and a rotatable plate with a lazy susan turntable, where the Atmega2560 reads the UAV location from the local GPS module & RSSI data from the directional antennas and then sends data to the local TX2. Once the TX2 finishes its computing, Atmega2560 receives motor control signals from the TX2 and outputs stable PWM signals to the motor driver to drive the motor for antenna control. In various embodiments, the Atmega2560 and motor driver are integrated on the compact TX2 carrier board to save space and reduce wires. In addition, the Atmega2560 is configured with various connection ports with the TX2, such as I2C, UART, and SPI ports. Atmega2560 and TX2 can work together to complete massive computing tasks and output stable PWM signals. As part of a rotational structure upgrade, a lazy susan turntable is selected to connect the rotational parts with non-rotational parts of the system and use a slip ring to connect the TX2 with the directional antenna and a built-in compass, which guarantees the coaxiality of the tuning plate to avoid shaking, which provides a more stable and smoother antenna rotation.

Automatic alignment of the antennas of the local and remote UAVs can be achieved by an exemplary antenna heading control algorithm of the present disclosure. In general, the desired heading is calculated from local and remote GPS locations of both UAVs for antenna alignment. The current heading is a direct output of a compass reading, where the TX2 directly reads the directional antenna heading from the compass module. The difference is sent to the heading control algorithm, such as, but not limited to, a Linear Quadratic Gaussian (LQG) controller having a Kalman filter and a linear quadratic regulator (LQR) (which is a state feedback controller). The Kalman filter can be used to estimate system states, and the LQG can be used to minimize a quadratic GPS-based tracking error. The LQG controller can be described as $p^* = -K_c \hat{x}$, where $\hat{x}$ is the system states, $p^*$ is the optimal control input, and $K_c$ is the gain matrix of optimal controller sent to the control part to rotate the directional antenna assembly.

The space and payload of the UAV platform restrict the size and weight of the components installed on it. Therefore, a small size, lightweight, and high capacity battery can be desired for an embodiment of the ACDA system. In one implementation, among others, a new rechargeable battery was designed using three Panasonic Li-ion MH12210 and a charge protection circuit board, such that the output voltage was 12.6V and the total capacity was 3250 mAH. Such a battery can support the ACDA system to work for up to 2 hours, which greatly enhances the durability of the system.

In various embodiments, the ROS is used to transmit messages between multiple devices in the ACDA system, such as communications between TX2 and Atmega2560 and TX2 and Pixhawk. In addition, an optical camera (OmniVision OV5693) and an infrared camera (FLIR LEPTON 3) are connected to the remote TX2 via a camera serial interface (CSI). As such, the remote TX2 can launch a ROS video node to obtain a high resolution (up to 2592×1944) image from the optical camera OV5693. Then, the remote TX2 can save the high-resolution image in a storage card on the remote TX2. Meanwhile, in various embodiments, the TX2 converts the high-resolution image to a low resolution image (640×480), which is displayed through an interface on a local computing device (e.g., laptop computer). The low-resolution images can be used for BVLOS UAV navigation control. To realize BVLOS UAV control, control signals for the remote side UAV can be transmitted through ACDA to the local side UAV.

To enable communication between the UAV processor (TX2) and UAV flight controller (Pixhawk), a message protocol (MAVLink) may be enabled on a configurable serial port of the flight controller (Pixhawk). In one embodiment, TELEM 2 (serial port) is selected to link with a USB port of TX2. The default setting of TELEM 2 port is disabled in Pixhawk's open source flight control software PX4 (V1.9.0). Therefore, the TELEM 2 port is enabled using a PX4 ground-station QGoundControl (QGC), which provides full flight control and can modify all configurable parameters in PX4.

In accordance with various embodiments, to realize BVLOS operation, remote UAV control is transmitted to the local side by connecting the Pixhawk flight controller to the ACDA system via MAVROS, which is a MAVLink communication node. In one embodiment, TX2 converts MAVLink messages to ROS messages so that a local computing device can read the messages and completely control the remote UAV. By utilizing ROS, a customized communication link between the local computing device and the remote Pixhawk is not required. Instead, the MAVROS ROS package can be used to build a bridge between MAVLink messages and ROS topics. As such, MAVROS publishes messages, such as IMU state, local position in the North-East-Down (NED) coordinate, global position information, and system status, to the ACDA system, and MAVROS subscribes ROS topics to control UAVs, including the local position, velocity, acceleration, attitude, angular rate, and thrust of a UAV in the local coordinate. In addition, MAVROS includes services to control UAV mobility, such as a waypoint service to set up waypoints, a param service to access the parameters of PX4, and command services to send arm, takeoff, and land commands to the Pixhawk flight controller, and check the UAV status.

After MAVROS is installed on TX2, MAVLink messages can be converted to ROS topics by executing a ROS PX4 node through a command in the terminal window of TX2. By setting up the linked port and baud rate, Pixhawk and TX2 are successfully connected, and hence Pixhawk and the ACDA system.

In the MAVLink protocol, there are two commands for off-board control of PX4 flight: a set position command and a set attitude command. Likewise, there are two ROS topics corresponding to these two commands in MAVROS. In one embodiment, the set position command is used for the BVLOS control of the remote UAV. As such, the message of the set position command can include flight control parameters coordinate (NED or body coordinate), position, velocity, acceleration, yaw, and yaw rate. The UAV can be controlled with the velocity (V X, V Y, V Z) and yaw in the body coordinate of the UAV. The body coordinate can be selected to perform off-board control and the ignore flag can be assigned to position, acceleration, and yaw parameters. The body coordinate in MAVROS is Right Forward Up (RFU), where the body coordinate in MAVLink is Forward Right Up (FRU). Therefore, there is a coordinate transformation between MAVROS and MAVLink. In one embodiment, eight keys on a standard keyboard are used to control UAV movements. In particular, the UAV movements correspond to move forward, backward, left, right, upward, downward, rotate clockwise, rotate counterclockwise, and hover in the air. In addition, if the time between two offboard commands exceeds 0.5 second, the flight mode of the PX4 will exit the offboard mode and restore the last mode of the Pixhawk. As such, the frequency of sending offboard commands should be larger than 2 Hz.

To test the performance of BVLOS UAV control with the ACDA system, a local UAV and a remote UAV were flown at the same altitude during a test flight, and then the end-to-end communication performance between the local computing device and remote computing device was measured by the Iperf testing tool. The throughput of the ACDA system was measured with different distances as shown in Table 2 (below).

TABLE 2

| Distance | 1000 m | 2000 m | 4000 m |
|---|---|---|---|
| Throughput | 45 Mbps | 40 Mbps | 20 Mbps |

From experimental testing, the performance of the BVLOS UAV control system was verified using flight simulation and a set of field test studies. During the field testing, the wind speed was less than 10 mph and the setup involved a computing device displaying the interface to monitor the status of the ACDA system on the local side along with another local computing device executing the BVLOS control for a remote UAV. Experimental results show that the remote UAV can be successfully controlled using a keyboard through the local UAV relay in the ACDA system. As such, the BVLOS UAV control system can be applied to many applications, such as health monitoring, surveillance and reconnaissance, among others.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. An aerial communication system comprising:
an unmanned aerial vehicle platform;
a communication component integrated with the unmanned aerial vehicle platform, wherein the communication component includes a directional antenna, a Wi-Fi router, and a Wi-Fi adapter, wherein the communication component is configured to establish an Air to Air (A2A) communication channel with a remote directional antenna that is integrated with a remote unmanned aerial vehicle platform;

a computing component integrated with the unmanned aerial vehicle platform, wherein the computing component includes a microprocessor; and a motor control component integrated with the unmanned aerial vehicle platform, wherein the motor control component includes a rotating motor that is configured to rotate the directional antenna for alignment with the remote directional antenna in accordance with a motor control signal outputted from the computing component, wherein the computing component is configured to determine an optimal heading angle for transmission of communication signals from the directional antenna to the remote directional antenna in an unknown communication environment from received signal strength indicator (RSSI) information obtained from the remote directional antenna, wherein the RSSI indicates a performance level of the A2A communication channel, wherein the computing component is configured to iteratively determine an environment-specific communication channel model in the unknown communication environment using the received RSSI information from the remote directional antenna, wherein the optimal heading angle for the directional antenna is determined using the communication channel model.

2. The aerial communication system of claim 1, wherein the aerial communication system is configured to transmit application data, status data, and control & command signals between the unmanned aerial communication platform and the remote unmanned aerial vehicle platform through the A2A communication channel.

3. The aerial communication system of claim 2, wherein the application data comprises a camera image or video captured from a camera that is integrated with the unmanned aerial vehicle platform or the remote unmanned aerial vehicle platform.

4. The aerial communication system of claim 2, further comprising:

a ground computing device wirelessly coupled to the communication component of the unmanned aerial vehicle platform over an air to ground communication channel, wherein the communication component is configured to transmit the application data and the status data for the aerial communication system to the ground computing device.

5. The aerial communication system of claim 4, wherein the application data comprises camera images or video streams.

6. The aerial communication system of claim 4, wherein the status data comprises GPS information for the unmanned aerial vehicle platform or the remote unmanned aerial vehicle platform, antenna heading information for the directional antenna or the remote directional antenna, and RSSI information for transmissions from the directional antenna or the remote directional antenna.

7. The aerial communication system of claim 2, wherein the control & command signals include flight control signals for the remote unmanned aerial vehicle platform that are transmitted via the A2A communication channel.

8. The aerial communication system of claim 1, wherein the computing component is configured to send, to the remote directional antenna, RSSI information for communication signals that the directional antenna has received from the remote directional antenna.

9. A method of aerial communications comprising:

launching an unmanned aerial vehicle platform in the air in an unknown communication environment;

establishing an Air to Air (A2A) communication channel between a directional antenna of the unmanned aerial vehicle platform and a remote directional antenna that is integrated with a remote unmanned aerial vehicle platform;

obtaining received signal strength indicator (RSSI) information from the remote directional antenna for communication signals transmitted from the directional antenna over the A2A communication channel;

determining an optimal heading angle for transmission of the communication signals from the directional antenna to the remote directional antenna in the unknown communication environment from the RSSI information obtained from the remote directional antenna;

iteratively determining an environment-specific communication channel model in the unknown communication environment using the received RSSI information from the remote directional antenna, wherein the optimal heading angle for the directional antenna is determined using the communication channel model;

rotating the directional antenna for alignment with the remote directional antenna at the optimal heading angle.

10. The method of claim 9, further comprising transmitting application data, status data, and control & command signals through the A2A communication channel.

11. The method of claim 10, wherein the application data comprises a camera image or video captured from a camera that is integrated with the unmanned aerial communication platform or the remote unmanned aerial vehicle platform.

12. The method of claim 10, further comprising:

wirelessly coupling a ground computing device to a communication component of the unmanned aerial vehicle platform over an air to ground communication channel; and transmitting the application data and the status data for an aerial communication system to the ground computing device, the aerial communication system comprising at least the unmanned aerial vehicle platform, the remote unmanned aerial platform, and the ground computing device.

13. The method of claim 12, wherein the application data comprises camera images or video streams.

14. The method of claim 12, wherein the status data comprises GPS information for the unmanned aerial vehicle platform or the remote unmanned aerial vehicle platform, antenna heading information for the directional antenna or the remote directional antenna, and RSSI information for transmissions from the directional antenna or the remote directional antenna.

15. The method of claim 10, wherein the control & command signals include flight control signals for the remote unmanned aerial vehicle platform that are transmitted via the A2A communication channel.

16. The method of claim 15, further comprising receiving, at the unmanned aerial vehicle platform, the flight control signals from a ground computing device, wherein the flight control signals are relayed to the remote unmanned aerial vehicle platform over the A2A communication channel.

17. The method of claim 9, further comprising sending, to the remote directional antenna, RSSI information angle for communication signals that the directional antenna has received from the remote directional antenna.

18. An aerial communication system comprising:
an unmanned aerial vehicle platform;
a communication component integrated with the unmanned aerial vehicle platform, wherein the communication component includes a directional antenna, a Wi-Fi router, and a Wi-Fi adapter, wherein the communication component is configured to establish an Air to Air (A2A) communication channel with a remote directional antenna that is integrated with a remote unmanned aerial vehicle platform;
a computing component integrated with the unmanned aerial vehicle platform, wherein the computing component includes a microprocessor; and
a motor control component integrated with the unmanned aerial vehicle platform, wherein the motor control component includes a rotating motor that is configured to rotate the directional antenna for alignment with the remote directional antenna in accordance with a motor control signal outputted from the computing component,
wherein the computing component is configured to determine an optimal heading angle for transmission of communication signals from the directional antenna to the remote directional antenna in an unknown communication environment from received signal strength indicator (RSSI) information obtained from the remote directional antenna, wherein the RSSI indicates a performance level of the A2A communication channel,
wherein the computing component is configured to initiate determination of the communication channel model in the unknown communication environment after the unmanned aerial vehicle platform is launched in the air.

\* \* \* \* \*